(12) United States Patent
Kijima et al.

(10) Patent No.: US 6,712,993 B2
(45) Date of Patent: Mar. 30, 2004

(54) PHOSPHOR AND ITS PRODUCTION PROCESS

(75) Inventors: Naoto Kijima, Yokohama (JP); Yasuo Shimomura, Odawara (JP); Tetsuji Umebara, Odawara (JP); Ilgnatius Wuled Lenggoro, Higashihiroshima (JP); Kikuo Okuyama, Higashihiroshima (JP)

(73) Assignees: Kasei Optonix, Ltd., Odawara (JP); Mitsubishi Chemical Corporation, Tokyo (JP)

( * ) Notice: Subject to any disclaimer, the term of this patent is extended or adjusted under 35 U.S.C. 154(b) by 11 days.

(21) Appl. No.: 10/325,826

(22) Filed: Dec. 23, 2002

(65) Prior Publication Data

US 2003/0094596 A1 May 22, 2003

Related U.S. Application Data

(63) Continuation of application No. PCT/JP02/04265, filed on Apr. 26, 2002.

(30) Foreign Application Priority Data

| Apr. 27, 2001 | (JP) | 2001-131207 |
| Apr. 27, 2001 | (JP) | 2001-131208 |
| Apr. 27, 2001 | (JP) | 2001-131209 |
| Apr. 27, 2001 | (JP) | 2001-131210 |
| Jul. 18, 2001 | (JP) | 2001-218181 |
| Jul. 24, 2001 | (JP) | 2001-256999 |

(51) Int. Cl.$^7$ .......... C09K 11/79; C09K 11/08
(52) U.S. Cl. .......... 252/301.4 R; 252/301.4 F; 252/301.4 P; 252/301.4 H; 252/301.4 S; 252/301.5; 252/301.1 R; 252/301.6 P; 252/301.6 R; 252/301.6 S
(58) Field of Search .......... 252/301.4 R, 301.4 F, 252/301.4 H, 301.4 P, 301.4 S, 301.5, 301.6 R, 301.6 S, 301.6 F, 301.6 P

(56) References Cited

U.S. PATENT DOCUMENTS

| 5,269,966 A | * 12/1993 | Karam et al. ........ 252/301.6 S |
| 5,885,492 A | * 3/1999 | Lee et al. ........ 264/12 |
| 6,039,894 A | * 3/2000 | Sanjurjo et al. ...... 252/301.4 R |
| 6,153,123 A | 11/2000 | Hampden-Smith et al. |
| 6,168,731 B1 | 1/2001 | Hampden-Smith et al. |
| 6,180,029 B1 | * 1/2001 | Hampden-Smith et al. ........ 252/301.4 R |
| 6,193,908 B1 | 2/2001 | Hampden-Smith et al. |
| 6,197,218 B1 | * 3/2001 | Hampden-Smith et al. ........ 252/301.4 R |
| 2001/0032963 A1 | 10/2001 | Kijima et al. |
| 2002/0182140 A1 | 12/2002 | Kijima et al. |

FOREIGN PATENT DOCUMENTS

| JP | 2000-87033 | 3/2000 |
| JP | 2000-109825 | 4/2000 |
| JP | 2000-336353 | 12/2000 |
| JP | 2001-107038 | 4/2001 |

OTHER PUBLICATIONS

Y.C. Kang, et al., Journal of Materials Science Letters, vol. 19, pp. 1225, "The Effect of Metal Carbonate Fluxes on the Crystallinity, Morphology, and Photoluminescence characteristics of $Y_2O_3$:Eu Phosphor in Spray Pyrollysis," 2000.

Y.C. Kang et al., J. Am. Ceram. Soc. vol. 84, No. 2, pp. 447, "Sodium Carbonate Flux Effects on the Luminescence Characteristics of $(Y_{a\ 0.5}Gd_{0.5})_2O_3$:Eu Phosphor Particles Prepared by Spray Pyrolysis", 2001.

Y.C. Kang, et al., Jpn. J. Appl. Phys., vol. 39, pp. L1305, "The Effect of Metal Chloride Fluxes on the Properties of Phosphor Particles in Spray Pyrolysis", 2000.

Y.C. Kan, et al., Journal of the European Ceramic Society, vol. 22, pp. 1661, "Use of LiCl Flux in the Preparation of $Y_2O_3$:Eu Phosphor Particles by Spray Pyrolysis", 2002.

B. Xia, et al., J. Mater. Chem., vol. 11, pp. 2925, "Synthesis of $CeO_2$ Nanoparticles by Salt–Assisted Ultrasonic Aerosol Decomposition", 2001.

B. Xia, et al., Advanced Materials, v 1. 13, No. 20, pp. 1579, "Novel Route to Nanoparticle Synthesis by Salt–assisted Aerosol Decomposition", Oct. 16, 2001.

\* cited by examiner

*Primary Examiner*—C. Melissa Koslow
(74) *Attorney, Agent, or Firm*—Oblon, Spivak, McClelland, Maier & Neustadt, P.C.

(57) ABSTRACT

A process for producing fine phosphor particles having a high crystallinity, having a small amount of aggregated particles and comprising fine particles, thus capable of forming a homogeneous and dense high brightness fluorescent layer when applied to e.g. a cathode ray tube, a fluorescent lamp or PDP, and having a high purity, a uniform chemical composition and excellent emission properties, at a low cost, is provided. A process for producing a phosphor, which comprises heating droplets of a solution containing metal elements constituting the phosphor to carry out pyrolysis to obtain the phosphor, wherein the above heating is carried out in the coexistence of an additive comprising a metal or a metal compound to carry out the pyrolysis at an average crystal growth rate of at least 0.002 $\mu m^3$/sec.

57 Claims, No Drawings

PHOSPHOR AND ITS PRODUCTION PROCESS

TECHNICAL FIELD

The present invention relates to a phosphor which is suitably used for a cathode ray tube, a fluorescent lamp, a plasma display panel (PDP), etc., and its production process.

BACKGROUND ART

A phosphor to be used for e.g. a cathode ray tube, a fluorescent lamp or PDP has conventionally been produced in such a manner that raw material powders are mixed and then packed in a baking container such as a crucible and heated at a high temperature for a long period of time to carry out pyrolysis by a solid state reaction to produce a phosphor, followed by grinding by e.g. a ball mill.

However, the phosphor produced by this process comprises a powder of aggregated particles having irregular shapes. If this phosphor is applied to the above use and a fluorescent layer is formed, only an inhomogeneous fluorescent layer having a low packing density tends to be obtained, and no excellent emission properties can be obtained. Further, physical and chemical impact is applied to the phosphor in a process of grinding by e.g. a ball mill after the solid state reaction, and thus defects are likely to occur in the inside or on the surface of the phosphor particles, thus decreasing the emission properties. Further, since heating at a high temperature is conducted for a long period of time in a baking container such as a crucible, impurities from the crucible tend to be included, thus decreasing emission properties, and further, the solid state reaction may not proceed adequately depending upon the particle diameter of the raw material powders, and an impurity phase coexists, whereby no high emission properties tend to be obtained. Further, since heating has to be carried out at a high temperature for a long period of time, the energy consumed tends to be large, thus increasing the production cost of the phosphor.

In order to overcome these problems, a process has been proposed wherein a solution containing metal elements constituting a phosphor is sprayed into a carrier gas by using e.g. an ultrasonic nebulizer to obtain fine droplets, which are dried to obtain metal salt particles or metal complex particles, and these metal salt particles or metal complex particles are introduced into a pyrolysis furnace by means of a carrier gas and heated to carry out pyrolysis to obtain a phosphor. However, with this process, no adequate residue time in the pyrolysis furnace can be taken, whereby the phosphor has a low crystallinity, and activator ions can not uniformly be contained in the crystals, and further, the phosphor obtained by this process has a large number of crystal defects in the inside or on the surface of the crystals, whereby a phosphor having good emission properties can not be obtained, such being problematic.

Accordingly, in order to overcome this problem, a two-stage heating process has been proposed wherein metal salt particles or metal complex particles are subjected to pyrolysis at a relatively low temperature for short period of time to obtain a powder comprising a desired crystal phase, which is once collected, and this powder is subjected to annealing at a relatively high temperature for a long time to obtain a phosphor. With this process, the crystallinity of the phosphor particles can further be increased, and at the same time, activator ions can be contained in the crystals more uniformly, whereby a spherical phosphor having good emission properties can be obtained. However, if such an once collected powder is subjected to annealing, although crystallinity of the phosphor may be good, an extremely large number of aggregated particles tend to be formed, and accordingly a new problem has risen that a fluorescent layer will not be dense when it is formed, and no desired emission properties can be obtained.

Accordingly, the present invention has been made to overcome the above problems, and to provide a process for producing a fine phosphor suitable for formation of a homogenous and dense high-brightness fluorescent layer when applied to e.g. a cathode ray tube, a fluorescent lamp or PDP, which has a narrow particle diameter distribution, which has a small amount of aggregated particles, which is spherical, which has a high purity and a uniform chemical composition, and which has excellent emission properties, and a phosphor obtained by the process.

DISCLOSURE OF THE INVENTION

The present inventors made it possible to overcome the above problems by employing the following means, and accomplished the present invention. Namely, the present invention has the following constitutions:

A. A process for producing a phosphor, which comprises heating droplets of a solution containing metal elements constituting the phosphor to carry out pyrolysis to obtain the phosphor, wherein the above heating is carried out in the coexistence of an additive comprising a metal or a metal compound to carry out the pyrolysis at an average crystal growth rate of at least $0.002\ \mu m^3/sec$.

B. A process for producing a phosphor, which comprises heating droplets of a solution containing metal elements constituting the phosphor to carry out pyrolysis to obtain the phosphor, wherein the above heating is carried out in the coexistence of a substance for thin film layer formation to precipitate the above substance for thin film layer formation on the surface of the above phosphor particles in the above process of pyrolysis to form a thin film layer having an average film thickness of at least 10 nm.

C. A process for producing a phosphor, which comprises heating droplets of a solution containing metal elements constituting the phosphor to carry out pyrolysis to obtain the phosphor, wherein the pyrolysis is carried out in an atmosphere gas containing a gaseous substance comprising (a) a metal chloride in a gaseous state, (b) a metal hydroxide in a gaseous state or (c) a hydrogen halide in a gaseous state.

D. A process for producing a phosphor, which comprises heating droplets of a solution containing metal elements constituting the phosphor and a dispersant in which the phosphor is dispersed in the process of forming the phosphor, to carry out pyrolysis to form the phosphor, wherein the phosphor is formed in such a state that a plurality of phosphor particles are dispersed in a particle of the above dispersant.

The present invention has the above constitutions, and their preferred embodiments are roughly classified into the following first to sixth embodiments.

First Embodiment (1) A process for producing a phosphor, which comprises heating droplets of a solution containing metal elements constituting the phosphor to carry out pyrolysis to obtain the phosphor, wherein the above heating is carried out in the coexistence of an additive comprising a metal or a metal compound to carry out the pyrolysis at an average crystal growth rate of at least $0.002\ \mu m^3/sec$.

(2) The process for producing a phosphor according to (1), wherein the above solution having the above additive added thereto is sprayed into a gas to form the above fine droplets, which are dried to form metal salt particles or metal complex particles, and they are heated to carry out the above pyrolysis.

(3) The production process according to (1) or (2), wherein the average crystal growth rate is adjusted to at least 0.01 $\mu m^3$/sec.

(4) The production process according to any one of (1) to (3), wherein for the above pyrolysis, the heating temperature is adjusted to from 1350 to 1900° C., and the heating time is adjusted to at least 0.5 second and at most 10 minutes.

(5) The production process according to any one of (1) to (4), wherein for the above pyrolysis, the heating temperature is adjusted to from 1450 to 1800° C., and the heating time is adjusted to at least 3 seconds and at most 1 minute.

(6) The production process according to any one of (1) to (5), wherein the above metal or metal compound contains at least one element selected from the group consisting of Li, Na, K, Rb and Cs.

(7) The production process according to (6), wherein the above metal compound is a nitrate, chloride or hydroxide.

(8) A phosphor produced by the production process as defined in any one of (1) to (7), wherein phosphor particles have a weight average particle diameter $D_{50}$ of from 0.1 to 50 $\mu m$, and the number of the phosphor particles having a ratio of the minimum diameter to the maximum diameter (minimum diameter/maximum diameter) within a range of from 0.8 to 1.0 is at least 90% of the entire particles.

(9) The phosphor according to (8), which comprises a crystal phase represented by the compositional formula $(R1_{1-x}, R2_x)_2O_3$ (where R1 is at least one element selected from the group consisting of Y, Gd, La, Lu and Sc, R2 is at least one element selected from the group consisting of Ce, Pr, Nd, Eu, Tb, Dy and Tm, and x is a number which satisfies $0<x\leq0.2$), as the main component.

Second Embodiment

(10) A process for producing a phosphor, which comprises heating droplets of a solution containing metal elements constituting the phosphor to carry out pyrolysis to obtain the phosphor, wherein the above heating is carried out in the coexistence of a substance for thin film layer formation to precipitate the above substance for thin film layer formation on the surface of the above phosphor particles in the above process of pyrolysis to form a thin film layer having an average film thickness of at least 10 nm.

(11) The process for producing a phosphor according to the above (10), wherein the above solution having the above substance for thin film layer formation added thereto is sprayed into a gas to form the above fine droplets, which are dried to obtain metal salt particles or metal complex particles, and they are heated to carry out pyrolysis so that the above substance for thin film layer formation is evaporated or decomposed to be in a gaseous state to form the above thin film layer on the surface of the above phosphor particles.

(12) The production process according to (10) or (11), wherein the above phosphor contains at least one element selected from the group consisting of Y, Gd, La, Lu and Sc, and at least one element selected from the group consisting of Ce, Pr, Nd, Eu, Tb, Dy and Tm.

(13) The production process according to any one of (10) to (12), wherein the above substance for thin film layer formation is a nitrate, chloride or hydroxide containing at least one element selected from the group consisting of Li, Na, K, Rb and Cs.

(14) The production process according to any one of (10) to (13), wherein the above solution is preliminarily prepared to satisfy the relation $(A\times0.1)\leq B$, where A is the total number of mols of the metal elements constituting the above phosphor and B is the total number of mols of the metal elements contained in the above substance for thin film layer formation.

(15) The production process according to (14), wherein the above solution for spraying is preliminarily prepared to satisfy the relation $(A\times0.1)\leq B\leq(A\times10)$, where A is the total number of mols of the metal elements constituting the above phosphor and B is the total number of mols of the metal elements contained in the above substance for thin film layer formation.

(16) The production process according to any one of (10) to (15), wherein for the pyrolysis, the heating temperature is adjusted to from 1350 to 1900° C., and the heating time is adjusted to at least 0.5 second and at most 10 minutes.

(17) The production process according to (16), wherein for the pyrolysis, the heating temperature is adjusted to from 1450 to 1800° C., and the heating time is adjusted to at least 3 seconds and at most 1 minute.

(18) The production process according to any one of (10) to (17), wherein the above thin film layer on the surface of the above phosphor particles is removed after the above pyrolysis.

(19) The production process according to (18), wherein the above thin film layer on the surface of the above phosphor particles is removed by water or an aqueous acidic solution.

(20) The production process according to (18) or (19), wherein the above phosphor particles having the above thin film layer removed are subjected to annealing.

(21) The production process according to (20), wherein the annealing is carried out at a temperature within a range of from 1000 to 1700° C. and at a temperature lower by at least 100° C. than the pyrolysis temperature, for a heating time of at least 1 second and at most 24 hours.

(22) The production process according to (21), wherein the annealing is carried out at a temperature within a range of from 1000 to 1700° C. and at a temperature lower by at least 200° C. than the pyrolysis temperature, for a heating time of at least 1 second and at most 24 hours.

(23) A phosphor produced by the process as defined in any one of the above (10) to (22), which comprises a crystal phase represented by the compositional formula $(R1_{1-x}, R2_x)_2O_3$ (where R1 is at least one element selected from the group consisting of Y, Gd, La, Lu and Sc, R2 is at least one element selected from the group consisting of Ce, Pr, Nd, Eu, Tb, Dy and Tm, and x is a number which satisfies $0<x\leq0.2$), as the main component.

(24) The phosphor according to (23), wherein the phosphor has a weight average particle diameter $D_{50}$ of from 0.1 to 50 $\mu m$ or a median diameter $D_{50}$ within a range of from 0.1 to 30 $\mu m$, and the number of phosphor particles having a ratio of the minimum diameter to the maximum diameter (minimum diameter/maximum diameter) within a range of from 0.8 to 1.0 comprises at least 90% of the entire particles.

Third Embodiment

(25) A process for producing a phosphor, which comprises heating droplets of a solution containing metal elements constituting the phosphor to carry out pyrolysis to obtain the phosphor, wherein the pyrolysis is carried out in an atmosphere gas containing a metal chloride in a gaseous state.

(26) The production process according to (25), wherein the above solution is sprayed into a gas to form the above fine droplets, which are dried to obtain metal salt particles or metal complex particles, and they are heated to carry out the above pyrolysis.

(27) The production process according to (25) or (26), wherein the above metal chloride in a gaseous state in the atmosphere gas for the above pyrolysis is present in an amount of from 0.001 to 5 vol % based on the above atmosphere gas.

(28) The production process according to any one of (25) to (27), wherein the above metal chloride is an alkali metal chloride.

(29) The production process according to (28), wherein the above alkali metal chloride is lithium chloride.

(30) The production process according to any one of (25) to (29), wherein the above solution containing metal elements constituting the phosphor has a pH of at most 7.

(31) The production process according to (30), wherein the above solution containing metal elements constituting the phosphor has a pH of at most 5.

(32) The production process according to any one of (25) to (31), wherein the above solution containing metal elements constituting the phosphor has a solid content of at most 10 wt %.

(33) The production process according to (32), wherein the above solution containing metal elements constituting the phosphor has a solid content of at most 1 wt %.

(34) The production process according to any one of (25) to (33), wherein the total content of carbon monoxide and carbon dioxide in the atmosphere gas for the above pyrolysis is adjusted to be at most 5 vol %.

(35) The production process according to (34), wherein the total content of carbon monoxide and carbon dioxide in the atmosphere gas for the above pyrolysis is adjusted to be at most 0.5 vol %.

(36) The production process according to (35), wherein the total content of carbon monoxide and carbon dioxide in the atmosphere gas for the above pyrolysis is adjusted to be at most 0.1 vol %.

(37) The production process according to any one of (25) to (36), wherein the above pyrolysis is carried out under heating at a temperature within a range of from 1350° C. to 1900° C. for at least 0.5 second and at most 10 minutes.

(38) The production process according to (37), wherein the above pyrolysis is carried out under heating at a temperature within a range of from 1350° C. to 1900° C. for at least 3 seconds and at most 1 minute.

(39) The production process according to (37) or (38), wherein the above pyrolysis is carried out under heating at a temperature within a range of from 1450° C. to 1800° C. for at least 3 seconds and less than 1 minute.

(40) The production process according to any one of (25) to (39), wherein in the above solution containing metal elements constituting the phosphor, a precursor of the above metal chloride in a gaseous state is preliminarily contained.

(41) The production process according to (40), wherein the above precursor is a metal chloride.

(42) A phosphor synthesized by the production process as defined in any one of (25) to (41), which comprises a crystal phase represented by the compositional formula $(R1_{1-x}, R2_x)_2O_3$ (where R1 is at least one element selected from the group consisting of Y, Gd, La, Lu and Sc, R2 is at least one element selected from the group consisting of Ce, Pr, Nd, Eu, Tb, Dy and Tm, and x is a number which satisfies $0<x\leq 0.2$), as the main component.

(43) The phosphor synthesized by the production process as defined in any one of (25) to (41), which has a crystal phase represented by the compositional formula $M^1M^2Al_{10}O_{17}$ (where $M^1$ is at least one element selected from the group consisting of Ba, Sr, Ca and Eu, and $M^2$ is at least one element selected from the group consisting of Mg and Mn), as the main component.

(44) The phosphor according to (42) or (43), wherein the phosphor has a median diameter $D_{50}$ within a range of from 0.1 to 30 μm, and the number of phosphor particles having a ratio of the minimum diameter to the maximum diameter (minimum diameter/maximum diameter) within a range of from 0.8 to 1.0 comprises at least 90% of the entire particles.

Fourth Embodiment

(45) A process for producing a phosphor, which comprises heating droplets of a solution containing metal elements constituting the phosphor to carry out pyrolysis to obtain the phosphor, wherein the pyrolysis is carried out in an atmosphere gas containing a metal hydroxide in a gaseous state.

(46) The production process according to (45), wherein the above solution is sprayed into a gas to form the above fine droplets, which are dried to obtain metal salt particles or metal complex particles, and they are heated to carry out the pyrolysis.

(47) The production process according to (45) or (46), wherein the above metal hydroxide in a gaseous state in the atmosphere gas for the above pyrolysis is present in an amount of from 0.001 to 5 vol % based on the above atmosphere gas.

(48) The production process according to any one of (45) to (47), wherein the metal hydroxide is an alkali metal hydroxide.

(49) The production process according to (48), wherein the above alkali metal hydroxide is lithium hydroxide.

(50) The production process according to any one of (45) to (49), wherein the above solution containing metal elements constituting the phosphor has a pH of at most 7.

(51) The production process according to (50), wherein the solution containing metal elements constituting the phosphor has a pH of at most 5.

(52) The production process according to any one of (45) to (51), wherein the above solution containing metal elements constituting the phosphor has a solid content of at most 10 wt %.

(53) The production process according to (52), wherein the above solution containing metal elements constituting the phosphor has a solid content of at most 1 wt %.

(54) The production process according to any one of (45) to (53), wherein the total content of carbon monoxide and carbon dioxide in the atmosphere gas for the above pyrolysis is adjusted to be at most 5 vol %.

(55) The production process according to (54), wherein the total content of carbon monoxide and carbon dioxide in the atmosphere gas for the above pyrolysis is adjusted to be at most 0.5 vol %.

(56) The production process according-to (55), wherein the total content of carbon monoxide and carbon dioxide in the atmosphere gas for the above pyrolysis is adjusted to be at most 0.1 vol %.

(57) The production process according to any one of (45) to (56), wherein the above pyrolysis is carried out under heating at a temperature within a range of from 1350° C. to 1900° C. for at least 0.5 second and at most 10 minutes.

(58) The production process according to (57), wherein the above pyrolysis is carried out under heating at a temperature within a range of from 1350° C. to 1900° C. for at least 3 seconds and at most 1 minute.

(59) The production process according to (57) or (58), wherein the above pyrolysis is carried out under heating at a temperature within a range of from 1450° C. to 1800° C. for at least 3 seconds and less than 1 minute.

(60) The production process according to any one of (45) to (59), wherein in the above solution containing metal elements constituting the phosphor, a precursor of the above metal hydroxide in a gaseous state is preliminarily contained.

(61) The production process according to (60), wherein the above precursor is a metal nitrate.

(62) A phosphor synthesized by the production process as defined in any one of (45) to (61), which comprises a crystal phase represented by the compositional formula $(R1_{1-x}, R2_x)_2O_3$ (where R1 is at least one element selected from the group consisting of Y, Gd, La, Lu and Sc, R2 is at least one element selected from the group consisting of Ce, Pr, Nd, Eu, Tb, Dy and Tm, and x is a number which satisfies $0<x\leq0.2$), as the main component.

(63) The phosphor synthesized by the production process as defined in any one of (45) to (61), which has a crystal phase represented by the compositional formula $M^1M^2Al_{10}O_{17}$ (where $M^1$ is at least one element selected from the group consisting of Ba, Sr, Ca and Eu, and $M^2$ is at least one element selected from the group consisting of Mg and Mn), as the main component.

(64) The phosphor according to (62) or (63), wherein the phosphor has a median diameter $D_{50}$ within a range of from 0.1 to 30 μm, and the number of phosphor particles having a ratio of the minimum diameter to the maximum diameter (minimum diameter/maximum diameter) within a range of from 0.8 to 1.0 comprises at least 90% of the entire particles.

Fifth Embodiment

(65) A process for producing a phosphor, which comprises heating droplets of a solution containing metal elements constituting the phosphor to carry out pyrolysis to obtain the phosphor, wherein the pyrolysis is carried out in an atmosphere gas containing a hydrogen halide in a gaseous state.

(66) The production process according to (65), wherein the above solution is sprayed into a gas to form the above fine droplets, which are dried to obtain metal salt particles or metal complex particles, and they are heated to carry out the above pyrolysis.

(67) The production process according to (66), wherein the above hydrogen halide in a gaseous state is hydrogen fluoride, hydrogen chloride or hydrogen bromide.

(68) The production process according to any one of (65) to (67), wherein the above pyrolysis is carried out under heating at a temperature within a range of from 600 to 1900° C. for a residue time within a range of from 0.5 second to 10 minutes.

(69) The production process according to (68), wherein the above pyrolysis is carried out under heating at a temperature within a range of from 600 to 1900° C. for a residue time within a range of from 0.5 second to 1 minute.

(70) The production process according to any one of (65) to (69), wherein the pyrolysis is carried out under heating in the above pyrolysis furnace at a temperature within a range of from 1450 to 1800° C. for a residue time within a range of from 0.5 second to 1 minute.

(71) The production process according to any one of (65) to (70), wherein in the above solution, a precursor of the above hydrogen halide in a gaseous state is preliminarily contained.

(72) The production process according to (71), wherein the above precursor is a non-metallic halide.

(73) The production process according to (72), wherein the above precursor is hydrofluoric acid, hydrochloric acid, hydrobromic acid, ammonium fluoride, ammonium hydrogenfluoride, ammonium chloride or ammonium bromide.

(74) A phosphor produced by the production process as defined in any one of (65) to (73), which comprises a crystal phase represented by the compositional formula $(R1_{1-x}, R2_x)_2O_3$ (where R1 is at least one element selected from the group consisting of Y, Gd, La, Lu and Sc, R2 is at least one element selected from the group consisting of Ce, Pr, Nd, Eu, Tb, Dy and Tm, and x is a number which satisfies $0<x\leq0.2$), as the main component.

(75) The phosphor produced by the production process as defined in any one of (65) to (73), which has a crystal phase represented by the compositional formula $M^1M^2Al_{10}O_{17}$ (where $M^1$ is at least one element selected from the group consisting of Ba, Sr, Ca and Eu, and $M^2$ is at least one element selected from the group consisting of Mg and Mn), as the main component.

(76) A phosphor produced by the process as defined in any one of (65) to (75), wherein the number of particles which satisfy the ratio of the minimum diameter ($D_S$) to the maximum diameter ($D_L$) of the phosphor particles ($D_S/D_L$) Of $0.8\leq(D_S/D_L)\leq0.10$, comprises at least 90% of the entire group of particles, and the median diameter ($D_{50}$) is within a range of from 0.1 to 30 μm.

Sixth Embodiment

(77) A process for producing phosphor particles, which comprises heating droplets of a solution containing metal elements constituting the phosphor while contacting them with a dispersant in which said phosphor particles are dispersed in the process of forming the above phosphor particles to carry out pyrolysis, so that a plurality of the above phosphor particles are dispersed in a particle of the above dispersant.

(78) The production process according to (77), wherein after the above solution is sprayed into a carrier gas to form fine droplets, said fine droplets are dried to obtain a solid state phosphor raw material, said solid state phosphor raw material is heated to form a precursor of the above phosphor, and the above heating is continued while contacting said precursor of the phosphor and the above dispersant in a molten state, to form a plurality of phosphor particles comprising a crystal phase of the above phosphor particles as the main phase, in a particle of the above dispersant suspended in the above carrier gas, from the above precursor of the phosphor.

(79) The process for producing phosphor particles, wherein as the material of the above dispersant, a precursor substance of the above dispersant which may form the dispersant in a molten state as defined in (77) or (78) at the time of formation of the above phosphor particles, is used.

(80) The process for producing phosphor particles according to any one of (77) to (79), wherein in the above solution containing metal elements constituting the above phosphor, the above dispersant or a precursor substance thereof is preliminarily contained.

(81) The process for producing phosphor particles according to any one of (77) to (80), wherein as the dispersant or a precursor substance thereof, at least one compound selected from the group consisting of an alkali metal halide, an alkaline earth metal halide, zinc halide and an alkali metal sulfide is used.

(82) The process for producing phosphor particles according to (81), wherein as the above dispersant or a precursor substance thereof, at least one compound selected from the group consisting of an alkali metal halide, a chloride of an alkaline earth metal except for beryllium, magnesium bromide, zinc fluoride, lithium sulfide, sodium sulfide and potassium sulfide is used.

(83) The production process according to any one of (77) to (82), wherein the amount of the above dispersant used is within a range of from 1 to 100 times the volume of the above phosphor.

(84) The production process according to any one of (77) to (83), wherein the formation temperature of the above phosphor particles is adjusted to be at least the melting point of the above dispersant and at most the temperature higher than the above melting point by 200° C.

(85) The production process according to any one of (77) to (84), wherein after the above phosphor particles are formed, the above dispersant is dissolved in water and removed.

(86) The production process according to any one of (77) to (85), wherein after the above phosphor particles are formed, the above dispersant is heated to be evaporated and removed.

(87) The production process according to any one of (77) to (86), wherein the maximum size of the above phosphor particles is within a range of from 1 to 500 nm.

(88) The production process according to (87), wherein the above maximum size is within a range of from 1 to 100 nm.

(89) The production process according to (88), wherein the above maximum size is within a range of from 1 to 10 nm.

BEST MODE FOR CARRYING OUT THE INVENTION

Now, the present invention will be explained in detail.

The process for producing a phosphor of the present invention is characterized in that when a solution having inorganic salts and/or organic compounds such as complexes of metal elements constituting the phosphor dissolved or dispersed therein (hereinafter the solution having compounds containing metal elements constituting the phosphor dissolved or dispersed therein will be referred to as "aqueous metal salt solution") is heated to carry out pyrolysis, droplets of the above aqueous metal salt solution are subjected to pyrolysis with a certain additive (hereinafter referred to as "additive") dissolved or suspended in the above aqueous metal salt solution, or with this additive present in a gaseous state in the atmosphere at the time of the above pyrolysis, to produce the desired phosphor. After the above aqueous metal salt solution is sprayed into a carrier gas to form fine droplets, they are dried to obtain metal salt particles of metals constituting the desired phosphor or particles of a complex of said metals (hereinafter referred to as "solid phosphor raw material particles"), and they are introduced to a pyrolysis furnace together with the carrier gas and heated to carry out pyrolysis.

The process for producing a phosphor of the present invention chiefly comprises the following first to sixth embodiments by general classification, and basically in any of these six embodiments in common, the phosphor is produced by means of 1) a step of preparing an aqueous metal salt solution or a solution having a certain additive incorporated in said aqueous metal salt solution (hereinafter the aqueous metal salt solution or the above aqueous metal salt solution containing an additive to be formed into droplets will sometimes be referred to as "phosphor raw material solution") (phosphor raw material solution preparation step), 2) a step for forming said phosphor raw material solution into fine droplets in a carrier gas (droplet formation step), 3) a step of classifying and drying the formed droplets to obtain solid phosphor raw material particles (droplet drying step), and 4) a step of transporting said solid phosphor raw material particles to a pyrolysis furnace together with the carrier gas and heating them to carry out pyrolysis to obtain a desired phosphor (pyrolysis step), and as the case requires, 5) a step of annealing the phosphor once obtained by pyrolysis in the above 4) pyrolysis step (annealing step) is further carried out.

Firstly, each production step in common with the production processes according to the respective embodiments of the present invention will be explained below.

1) Phosphor Raw Material Solution Preparation Step:

In the present invention, for preparation of the phosphor raw material solution, metal salts or metal complexes containing metal elements constituting the phosphor is introduced into a solvent such as water and dissolved or dispersed in the solvent to obtain an aqueous metal salt solution, and a certain additive is further dissolved or dispersed in the aqueous metal salt solution as the case requires to obtain a phosphor raw material solution. Inorganic salts or organic metal compounds such as metal complexes containing metal elements constituting the phosphor, used for preparation of the phosphor raw material solution, are not particularly limited so long as they are water-soluble compounds or fine particulate compounds capable of being dispersed in a liquid, and they undergo pyrolysis into oxides when heated to a high temperature. It is also possible to use an aqueous metal salt solution obtained by dissolving oxides of metal elements constituting the phosphor in an acid. However, in order to easily synthesize the phosphor, it is preferred to use an aqueous nitrate solution or an aqueous halide solution of metal elements constituting the phosphor, particularly an aqueous nitrate solution. Nitrate particles obtained by spraying the aqueous nitrate solution to form fine droplets, followed by drying, easily decompose by heating to form a phosphor. At that time, preferably at least 10 wt % of the metal salts dissolved in the aqueous metal salt solution are nitrates. It is more preferred that at least 50 wt % of the metal salts dissolved in the aqueous metal salt solution are nitrates.

The concentration of each metal element including the additive in the phosphor raw material solution is adjusted taking the diameter of the aimed phosphor particles and the diameter of fine droplets formed by spraying the aqueous metal salt solution into consideration. Namely, when the ratio of the droplet diameter of the phosphor raw material solution relative to the diameter of phosphor particles to be synthesized is high, the solute concentration in the phosphor raw material solution is decreased, and when the ratio is low, the solute concentration is increased. In order to synthesize a good phosphor, the solute concentration C of the metal elements in the aqueous solution is preferably within a range of $0.01 \leq C \leq 5$. If the solute concentration is lower than 0.01, the amount of the phosphor synthesized tends to be small relative to the water content removed by drying, thus decreasing the productivity. On the other hand, if the solute concentration is higher than 5, droplets are hardly formed. Here, C is the total number of mols of the entire metal elements of the phosphor raw materials contained in 1 l of the phosphor raw material solution. In order to obtain a phosphor having favorable emission properties, it is preferred to use an aqueous metal salt solution having a low content of impurity elements such as iron or nickel to be a killer center.

The pH of the aqueous metal salt solution is adjusted to be preferably at most 7, more preferably at most 5. When the pH of this aqueous metal salt solution is adjusted to be at most 7, a homogeneous aqueous solution tends to be formed, and homogeneous droplets can be formed by spraying, whereby a homogeneous phosphor can be synthesized. If the pH of the aqueous metal salt solution exceeds 7, a large amount of a precipitate of hydroxides of the metal elements constituting the phosphor forms, whereby the liquid component is formed into droplets by priority at the time of spraying to form fine droplets, whereby a predetermined amount of the metal elements constituting the phosphor are hardly contained in the droplets, and as a result, the composition of the phosphor may vary or the particle diameter may vary, and a homogeneous phosphor having high emission properties can hardly be obtained.

Further, in this aqueous metal salt solution, the compounds of the metal elements constituting the phosphor may not completely be dissolved and may be suspended in the form of a solid such as a metal salt, sol or colloid in part, however, in a case where a solid content is present in the aqueous metal salt solution, the proportion of the solid content is suppressed to be preferably at most 10 wt %, more preferably at most 1 wt %. If a large amount of solid content in the form of e.g. a metal salt, sol or colloid is present in the aqueous metal salt solution, the liquid component is formed into droplets by priority at the time of spraying, whereby e.g. the metal salt, sol or colloid as a solid content is hardly contained in the droplets, and as a result, the composition of the phosphor may vary or the particle diameter may vary, and no homogeneous phosphor having high emission properties tends to be obtained.

2) Droplet Formation Step:

The aqueous metal salt solution or the phosphor raw material solution further containing an additive as the case requires, prepared as described above, is formed into fine droplets in the carrier gas. As a method of forming fine droplets from the phosphor raw material solution in the carrier gas, various methods can be employed as follows. For example, a method of spraying a liquid while drawing it up with a pressurized air to form droplets of from 1 to 50 $\mu$m, a method of utilizing ultrasonic waves at a level of 2 MHz from piezoelectric crystals to form droplets of from 4 to 10 $\mu$m, a method wherein an orifice having a pore size of from 10 to 20 $\mu$m is oscillated by a transducer, and a liquid supplied thereto at a constant rate is discharged from the pore in a constant amount depending upon the frequency to form droplets of from 5 to 50 $\mu$m, a method of letting a phosphor raw material solution fall on a rotating disk at a constant rate to form droplets of from 20 to 100 $\mu$m by centrifugal force, or a method of applying a high voltage to the liquid surface to form droplets of from 0.5 to 10 $\mu$m, may be mentioned.

3) Droplet Drying Step

Before drying fine droplets of the phosphor raw material solution formed in the droplet forming process to form solid phosphor raw material particles, the fine droplets of the phosphor raw material solution are classified so that the weight average particle diameter of the fine droplets is from 0.5 to 50 $\mu$m, and 90 wt % of the fine droplets have a particle diameter at most double the weight average particle diameter, whereby the particle diameter distribution can be narrowed, and a phosphor excellent in coating properties at the time of forming a fluorescent layer can be produced. Fine droplets removed before drying may be recovered and reused as a phosphor raw material solution as the raw material. As a result, a phosphor having a narrow particle diameter distribution can be produced with a high yield. If small droplets having a particle diameter smaller than 0.5 $\mu$m increase, the phosphor to be formed tends to be so small as less than 0.1 $\mu$m, and when a fluorescent layer for e.g. a display is formed, the viscosity of a phosphor slurry tends to be high, and coating properties tend to decrease. On the other hand, if droplets larger than 50 $\mu$m increase, the phosphor to be formed tends to be extremely large, whereby a dense and high definitive fluorescent layer is less likely to be formed. It is more preferred to adjust the particle diameter by classification of the fine droplets of the aqueous metal salt solution so that the weight average particle diameter is within a range of from 1 to 20 $\mu$m and 90 wt % of the fine droplets are fine droplets having a particle diameter at most double the weight average particle diameter.

In order to increase the production efficiency of the phosphor in the pyrolysis of the phosphor raw material solution to produce the phosphor, it is preferred to concentrate the droplet volume per unit volume of the carrier gas for droplets by a classifier. As a classifier, a classifier by gravity, a centrifugal classifier or an inertia classifier may, for example, be used. Among them, an inertia classifier is preferred to remove fine droplets having a particle diameter smaller than the above lower limit with part of the gas from the carrier gas for fine droplets, to concentrate the droplet volume per unit volume of the carrier gas for droplets.

The fine droplets thus obtained from the phosphor raw material solution may be heated for pyrolysis as they are, however, it is preferred to firstly dry the obtained droplets to once obtain solid phosphor raw material particles, and heating them for pyrolysis. As a method of drying the droplets, freeze drying, vacuum drying, diffusion drying or drying by heating may, for example, be employed. Drying by heating which can be carried out at a low cost is preferred in industrial production as compared with freeze drying, vacuum drying, diffusion drying, etc.

In the case where the fine droplets are dried by heating, the heating rate is preferably at most 400° C. per second. When the drying rate is higher than 400° C. per second, a layer of metal salts or metal complexes is formed on the surface of the droplets before moisture at the center part of the droplets evaporates at the time of drying, whereby no spherical and solid phosphor particles tend to be formed, and hollow particles will be obtained or fine particles will be obtained by explosion. When the heating rate at the time of drying is at most 200° C. per second, spherical and solid phosphor particles can be produced stably.

It is preferred to maintain the solid phosphor raw material particles obtained by drying at a temperature of at least 100° C. until the pyrolysis. If they have a temperature lower than 100° C. before pyrolysis, water vapor generated at the time of drying may condense, whereby the metal salt particles or the metal complex particles (solid phosphor raw material particles) are re-dissolved in part, whereby there is a fear that phosphor particles having desired shape and particle diameter can not be obtained.

4) Pyrolysis Step

The solid phosphor raw material particles obtained by drying the droplets of the phosphor raw material solution are then introduced to a pyrolysis furnace together with the carrier gas, heated and undergo pyrolysis and synthesis to form desired phosphor particles. It is possible to control the shape and the surface state of the phosphor particles to be formed, such as hollow spheres, porous particles, solid particles or crushed particles, by selecting factors which have an influence over the heating rate such as the type of the phosphor raw material solution, the type of the gas, the gas flow rate and the temperature in the pyrolysis furnace.

For pyrolysis of the solid phosphor raw material particles, the optimum temperature is selected taking the type of the phosphor to be synthesized, the type and amount of the metal or the metal compound to be added to the phosphor raw material into consideration, and specifically, it is preferred that the heating temperature is from 1350 to 1900° C. and the heating time is within a range of at least 0.5 second and at most 10 minutes, and it is particularly preferred that the heating temperature is from 1450 to 1800° C., and the heating time is at least 3 seconds and at most 1 minute. If the pyrolysis temperature is lower than the above range or the heating time is shorter than the above range, the metal salts may not undergo adequate pyrolysis, whereby no desired phosphor may be formed. Further, the crystallinity tends to be low, whereby the activator ions may not adequately be contained in the crystal, whereby emission properties tend to be low. On the other hand, if the pyrolysis temperature is higher than the above range or the heating time is too long, an unnecessary energy tends to be wasted.

In the process for producing a phosphor of the present invention, as a carrier gas for droplets consisting of the phosphor raw material solution, air, oxygen, nitrogen, hydrogen, or nitrogen or argon containing a small amount of carbon monoxide or hydrogen, may, for example, be used, however, in order to obtain favorable emission properties, it is important to select the gas depending upon the chemical composition of the phosphor and the type of the activator ion contributing to light emission. For example, in a case where the phosphor comprising as the main phase an oxide employing e.g. $Eu^{3+}$ which is likely to maintain the valency in an oxidizing atmosphere as an activator ion is to be synthesized, an oxidizing gas such as air or oxygen is preferred, and in a case where a phosphor comprising as the main phase an oxide employing e.g. $Eu^{2+}$ which is likely to maintain the valency in a reduction atmosphere as the activator ion is to be synthesized, a reduction gas such as hydrogen, or nitrogen or argon containing a small amount of hydrogen is preferred.

Depending upon the type of the phosphor to be produced, the content of carbon monoxide and carbon dioxide in the atmosphere for pyrolysis is adjusted to preferably at most 5 vol %, more preferably at most 0.5 vol %. If it exceeds 5 vol %, a basic carbonate may precipitate in the inside or on the surface of the phosphor, thus decreasing the emission properties of the phosphor. For example, a basic carbonate is likely to precipitate in the case of a $Y_2O_3$:Eu phosphor or $Y_2O_3$: Tb phosphor for example.

The powder (phosphor) formed in the pyrolysis furnace is collected by e.g. a bag filter. The obtained powder (phosphor) may be used as a phosphor as it is in some cases, and a certain post-treatment may be required in other cases. As one of required post-treatments, the additive may be washed with an acid or water and removed. For example, a powder containing a phosphor obtained by the heat treatment is put in water and stirred, and then subjected to centrifugal separation, and the supernatant fluid is removed, and this operation is repeatedly carried out, followed by drying to remove a water-soluble component.

Now, characteristics of the invention according to the first to sixth embodiments will be explained below.

In the present invention, the production process according to the first embodiment is characterized in that a phosphor raw material solution having an additive comprising a metal or a metal compound, for adjustment of the average crystal growth rate of the phosphor, added to the above aqueous metal salt solution, is used, and the above phosphor raw material solution is sprayed into a gas to form fine droplets in accordance with the above-described steps in common with the processes for producing the phosphor of the present invention, and the fine droplets are dried to obtain solid phosphor raw material particles, which are heated in a pyrolysis furnace to carry out pyrolysis to form the phosphor, and the average crystal growth rate of the phosphor is adjusted to a certain rate at that time.

By adjusting the average crystal growth rate of the phosphor to at least $0.002\ \mu m^3$/sec when the solid phosphor raw material particles obtained by drying the droplets of the phosphor raw material solution are subjected to pyrolysis to form the phosphor, whereby a phosphor having excellent emission properties can be provided.

If the average crystal growth rate of the phosphor formed when the solid phosphor raw material particles are heated for pyrolysis is lower than $0.002\ \mu m^3$/sec, lattice defects or surface defects are likely to be contained in the phosphor, whereby no phosphor having excellent emission properties can be obtained. On the other hand, if this rate is too high, there will be few problems in view of properties of the phosphor, however, such is not practical in many cases since the amount of the additive has to be increased or the heating temperature has to be increased. The more preferred range of the average crystal growth rate is from 0.01 to $500\ \mu m^3$/sec.

In the present invention according to the first embodiment, the average crystal growth rate is defined as follows. Namely, the diameter of a primary particle of the phosphor particles is read from a scanning electron micrograph of the obtained phosphor. Here, the primary particle is a minimum particle defined by a grain boundary observed in a particle which is considered to be present independently. Here, in a case where the primary particle is not spherical, an intermediate value of the maximum diameter and the minimum diameter is read. From this primary particle diameter, the volume is obtained presuming the primary particle as a sphere. The value obtained by dividing this volume by the heating time is taken as the average crystal growth rate. The unit of the average crystal growth rate is $\mu m^3$/sec when the unit of the particle diameter is $\mu m$ and the unit of the heating time is sec.

In the production process according to the first embodiment of the present invention, as the additive comprising a metal or a metal salt to be added to the aqueous metal salt solution, for adjustment of the above-described average particle growth rate, an alkali metal i.e. Li, Na, K, Rb, Cs, etc., or a compound thereof, may, for example, be used. Among them, particularly preferred are a nitrate, chloride, hydroxide, etc. of an alkali metal. The additive is preferably such that the residue after the heat treatment has no influence over emission properties, or it can easily be removed by a post-treatment. The above additive is not necessarily added to the aqueous metal salt solution from the beginning as described above, and a solution containing the above additive may be introduced to the pyrolysis furnace directly, or it is separately heated for decomposition and formed into a liquid or gaseous state and then introduced to the furnace, and heated together with the solid phosphor raw material particles for pyrolysis.

In the present invention, the production process according to the second embodiment is characterized in that a phosphor raw material solution having a substance for thin film layer formation to cover the surface of the phosphor with a thin film layer, as an additive dissolved or dispersed in the above aqueous metal salt solution, is used, and the above phosphor raw material solution is sprayed into a gas to form fine droplets in accordance with the above-described steps in common with the phosphor of the present invention, and the fine droplets are dried to obtain solid phosphor raw material particles, which are heated in a pyrolysis furnace to carry out the pyrolysis to form a phosphor having its surface covered with a thin film layer comprising the substance for thin film layer formation.

The substance for thin film layer formation to be added to the aqueous metal salt solution is not particularly limited so long as it can be dissolved or dispersed in the aqueous metal salt solution, contained in the solid phosphor raw material particles in the drying step, is vaporized or undergoes pyrolysis at a pyrolysis temperature to be in a gaseous state, and precipitates on the surface of the phosphor particles to be obtained ultimately by the pyrolysis of the solid phosphor raw material particles to form a thin film, and improves emission properties of the phosphor. Specifically, a nitride, chloride or hydroxide containing at least one element selected from the group consisting of Li, Na, K, Rb and Cs may be used. Among them, a nitrate of Li is particularly preferred. In the production process according to the second embodiment also, the above substance for thin film layer formation is not necessarily added to the aqueous metal salt solution from the beginning as described above, and the above substance for thin film layer formation may be introduced to the pyrolysis furnace directly or after it is separately heated for evaporation and decomposition, and then heated together with the solid phosphor raw material particles for pyrolysis.

The thin film layer is preferably removed from the surface of the phosphor particles thus obtained by the production process according to the second embodiment of the present invention, because the thin film layer may deteriorate emission properties of the phosphor or coating properties in some cases. As the removal method, a method of evaporating and removing the thin film layer by heating, or a method of dissolving it with a solvent, may, for example, be mentioned. The solvent used is not particularly limited so long as it does not dissolve the phosphor particles and selectively dissolves the thin film layer. For example, water or an acidic aqueous solution is preferred, which can be used simply at a low cost.

In the production process according to the second embodiment, by evaporating or decomposing the above substance for thin film layer formation into a gaseous state in the above process of pyrolysis to precipitate it on the surface of the above phosphor particles to form a thin film layer having an average film thickness of at least 10 nm, a phosphor which has a narrow particle diameter distribution, which has a small amount of aggregated particles, which is spherical, which has a high purity and a uniform chemical composition, and which has excellent emission properties, can be provided at a low cost, and it is possible to form a homogeneous and dense high brightness fluorescent layer when applied to e.g. a cathode ray tube, a fluorescent lamp or a PDP, after the thin film layer formed on the surface is removed. The thin film layer which covers the phosphor of the present invention preferably has an average film thickness of at least 10 nm. If it is thinner than 10 nm, it tends to be difficult to homogeneously cover the surface of the phosphor particles, and emission properties can not adequately be improved. The more preferred range of the average layer thickness is from 20 to 500 nm. The average film thickness of the thin film layer is determined by observation with a scanning electron microscope of the cross section of the phosphor particles.

In the production process according to the second embodiment, it is preferred to preliminarily prepare the phosphor raw material solution comprising the aqueous metal salt solution containing a substance for thin film layer formation so as to satisfy the relation $(A \times 0.1) \leq B$ when the total number of mols of the metal elements constituting the phosphor is A and the total number of mols of the metal elements contained in the substance for thin film layer formation is B. If the substance for thin film layer formation is smaller than the above range, the thin film layer tends to be too thin and non-uniform, whereby the phosphor particles can not adequately be covered, and the emission properties of the phosphor can not adequately be improved. In such a case, the relation of the above solution is preferably $(A \times 0.1) \leq B \leq (A \times 10)$.

As the phosphor to which the production process according to the second embodiment of the present invention can be applied, a phosphor comprising as the main component a crystal phase represented by the compositional formula $(R1_{1-x}, R2_x)_2O_3$ (where R1 is at least one element selected from the group consisting of Y, Gd, La, Lu and Sc, R2 is at least one element selected from the group consisting of Ce, Pr, Nd, Eu, Tb, Dy and Tm, and x is a number which satisfies $0<x\leq 0.2$) may, for example, be mentioned. In a case where a phosphor of the above-mentioned compositional formula $(R1_{1-x}, R2_x)_2O_3$ according to the second embodiment of the present invention is produced, an oxide phosphor having favorable emission properties can be synthesized by adjusting the phosphor raw material solution to be sprayed so that it contains a compound containing at least one element R1 selected from the group consisting of Y, Gd, La, Lu and Sc and a compound containing at least one element R2 selected from the group consisting of Ce, Pr, Nd, Eu, Tb, Dy and Tm, and further contains a compound containing at least one element selected from the group consisting of Li, Na, K, Rb and Cs as a substance for thin film layer formation, and a condition $(C \times 0.1) \leq D \leq (C \times 10)$ is met when the total number of mols of R1 and R2 in the aqueous metal salt solution is C and the total number of mols of the metal elements contained in the substance for thin film layer formation is D. With respect to this oxide phosphor also, if the total number of mols D of the metal elements contained in the substance for thin film layer formation is smaller than $(C \times 10)$, the thin film layer on the surface of the phosphor particles tends to be too thin and non-uniform, and the emission properties of the phosphor can not adequately be improved. Further, if it is higher than $(C \times 10)$, an unnecessary material is consumed, thus increasing the cost of the phosphor.

The production process according to the third embodiment of the present invention is characterized in that when the above phosphor raw material solution is formed into fine droplets in the carrier gas in accordance with the above-described steps in common with the processes for producing the phosphor of the present invention, and the fine droplets are dried to obtain solid phosphor raw material particles, which are heated to carry out pyrolysis to produce the phosphor, a metal chloride in a gaseous state is contained in the atmosphere gas to carry out heating and pyrolysis. By producing a phosphor by the production process according to this embodiment, crystallinity of the phosphor is improved, generation of aggregated particles is suppressed, and a phosphor having a high purity and uniform chemical composition and excellent emission properties can be provided.

In the production process according to the third embodiment, a metal chloride in a gaseous state is contained in the atmosphere gas at the time of pyrolysis of droplets of the phosphor raw material solution or the solid phosphor raw material particles obtained by drying them, and in order to obtain an atmosphere containing a metal chloride in a gaseous state, (i) a method of introducing a metal chloride which is brought into a gaseous state by preliminarily heating a precursor substance of the metal chloride in a gaseous state to a pyrolysis furnace, (ii) a method of directly introducing the aqueous solution of a metal chloride to a pyrolysis furnace, or (iii) a method of using a solution having a precursor substance of a metal chloride in a gaseous state preliminarily incorporated as the additive in the aqueous metal salt solution, as the phosphor raw material solution, may, of example, be mentioned. Among the methods, the above method (iii) of using the phosphor raw material solution having a precursor substance which can be a metal chloride in a gaseous state incorporated in the aqueous metal salt solution is preferred since it can easily be carried out.

As the additive to be added to the aqueous metal salt solution, it is preferred to add a precursor substance of a metal chloride which forms a metal chloride in a gaseous state at a pyrolysis temperature. The precursor substance is more preferably a metal chloride which easily gasifies by heating. By reacting the metal chloride in a gaseous state at a pyrolysis temperature with phosphor particles, a phosphor having excellent properties can be synthesized in a short time at a level of from several seconds to several minutes. The above precursor substance is not particularly limited so long as it can form a metal chloride in a gaseous state at a pyrolysis temperature. However, an alkali metal chloride which is likely to gasify and which is stable in a gaseous state, is particularly preferred. Among them, when lithium chloride is used as the precursor substance, a phosphor having most favorable emission properties can be produced. Further, since a compound of the metal chloride in a gaseous state with carbon monoxide or carbon dioxide may form to decrease the emission properties of the obtained phosphor, the content of carbon monoxide and carbon dioxide in the atmosphere gas for pyrolysis is particularly preferably at most 0.1 vol %.

As mentioned above, a phosphor is produced by the production process according to the third embodiment by means of the above-described steps in common with the processes for producing a phosphor of the present invention except that heating is carried out while a metal chloride capable of providing a metal chloride in a gaseous state to the atmosphere when heating for pyrolysis is carried out or a precursor thereof, is contained in the phosphor raw material solution or directly supplied to the pyrolysis furnace.

In the case of the production process according to the third embodiment, it is important that the pyrolysis is carried out in an atmosphere containing a metal chloride in a gaseous state, in order to obtain a phosphor having high emission properties. The metal chloride in a gaseous state is present in an amount of from 0.001 to 5 vol %, particularly preferably from 0.01 to 1 vol %, based on the atmosphere gas at the time of pyrolysis. If the metal chloride in a gaseous state is too small or too large, the emission properties of the obtained phosphor tend to decrease. To dry the obtained droplets to form solid phosphor raw material particles, drying by heating is preferred since it can be carried out at a low cost in industrial production. However, in a case where a phosphor is produced by the production process according to the third embodiment of the present invention, in a case where the droplets comprising the phosphor raw material solution are dried to obtain solid phosphor raw material particles, it is more preferred that moisture is removed from the fine droplets by a diffusion drying method to obtain metal salt particles or metal complex particles, which are then introduced to the pyrolysis furnace, whereby the metal chloride in a gaseous state easily forms.

The production process according to the fourth embodiment of the present invention makes it possible to improve crystallinity of the phosphor, to suppress generation of the aggregated particles, and to provide a phosphor having a high purity, a uniform chemical composition and excellent emission properties, by incorporating a metal hydroxide in a gaseous state in the atmosphere gas when the above aqueous metal salt solution is formed into fine droplets in a carrier gas in accordance with the above-described steps in common with the processes for producing a phosphor of the present invention, and the droplets are dried to form solid phosphor raw material particles, which are heated to carry out pyrolysis to produce a phosphor.

In the production process according to the fourth embodiment of the present invention, it is preferred to add a precursor substance which can be a metal hydroxide in a gaseous state when reacted with water at a pyrolysis temperature, as an additive to the aqueous metal salt solution to obtain a phosphor raw material solution. As the precursor substance, a metal nitrate which easily decomposes by heating and reacts with water is more preferred. When the metal hydroxide in a gaseous state is reacted with phosphor particles at a pyrolysis temperature, a phosphor having high properties can be synthesized in a short time at a level of from several seconds to several minutes.

The precursor substance which can be a metal hydroxide in a gaseous state is not particularly limited so long as it can form a metal hydroxide in a gaseous state when reacted with water at a pyrolysis temperature. Further, preferred is an alkali metal nitrate in view of reactivity with water, stability in gaseous state, etc. Among them, when lithium nitrate is used as the precursor substance, a phosphor having most favorable emission properties can be produced. In the case of the production process according to the fourth embodiment also, similar to the case of the production process according to the third embodiment, the above metal hydroxide which can be in a gaseous state or a precursor thereof is incorporated in the atmosphere gas at the time of pyrolysis of the solid phosphor raw material particles by employing (i) a method of introducing a metal hydroxide which is preliminarily brought into a gaseous state by heating to pyrolysis, (ii) a method of directly introducing an aqueous solution of a metal hydroxide to a pyrolysis furnace, or (iii) a method of incorporating it in the phosphor raw material solution from the beginning, etc.

In the production process according to the fourth embodiment of the present invention, the phosphor of the present invention is produced by means of the above-described steps in common with the processes for producing the phosphor of the present invention except that droplets of the phosphor raw material solution having a metal hydroxide capable of supplying a metal hydroxide in a gaseous state to the atmosphere when heating for pyrolysis is carried out or a precursor thereof added thereto or solid phosphor raw material particles obtained by drying them, are heated for pyrolysis in an atmosphere containing a metal hydroxide in a gaseous state.

The production process according to the fifth embodiment of the present invention makes it possible to improve crystallinity of the phosphor, to suppress generation of aggregated particles, and to provide a phosphor having a high purity, a uniform chemical composition and excellent emission properties, by incorporating a hydrogen halide in a gaseous state in the atmosphere gas when the above aqueous metal salt solution is formed into fine droplets in a carrier gas in accordance with the above-described steps in common with the processes for producing a phosphor of the present invention, the droplets are dried to obtain solid phosphor raw material particles, which are heated to carry out pyrolysis to produce a phosphor.

In the production process according to the fifth embodiment of the present invention, it is preferred to incorporate a precursor substance which can form a hydrogen halide in a gaseous state at a pyrolysis temperature in the above-described aqueous metal salt solution, as the phosphor raw material solution to be formed into fine droplets. In the case of production process according to the fifth embodiment also, similar to the cases of the production processes according to the above-described third and fourth embodiments, the above halide in a gaseous state or a precursor thereof may be formed into a liquid or gaseous state and directly introduced to the atmosphere gas in the pyrolysis furnace to heat the solid phosphor raw material particles to carry out pyrolysis. As the precursor substance, more preferred is a non-metallic halide which easily vaporizes by heating. When a hydrogen halide in a gaseous state is reacted with phosphor particles at a pyrolysis temperature, a phosphor having favorable properties can be synthesized in a short time at a level of from several seconds to several minutes. The precursor substance which can form a hydrogen halide in a gaseous state is not particularly limited so long as it can form a hydrogen halide in a gaseous state at a pyrolysis temperature. However, preferred as the precursor substance is hydrofluoric acid, hydrochloric acid, hydrobromic acid, ammonium fluoride, ammonium hydrogen fluoride, ammonium chloride or ammonium bromide, since a phosphor having favorable phosphor properties can be synthesized.

The phosphor raw material solution containing a precursor substance which forms a hydrogen halide in a gaseous state at a pyrolysis temperature in the aqueous metal salt solution is then formed into fine droplets in a carrier gas in accordance with the above-described steps in common with the processes for producing a phosphor of the present invention, and an operation of classification and drying is applied to the fine droplets as the case requires, and then the formed solid phosphor raw material particles are introduced to the pyrolysis furnace together with the carrier gas to carry out pyrolysis, whereby the phosphor according to the fifth embodiment of the present invention is produced.

In the production process according to the fifth embodiment of the present invention, it is required to employ an atmosphere containing a hydrogen halide in a gaseous state for pyrolysis in order to obtain a phosphor having a high emission intensity. An atmosphere containing a hydrogen halide in a gaseous state is achieved by a method of introducing a hydrogen halide which is brought into a gaseous state by preliminarily heating said precursor substance to a pyrolysis furnace, or a method of directly introducing an aqueous solution of a hydrogen halide to a pyrolysis furnace, similar to the case of the above production process according to the third embodiment of the present invention, in addition to a method of using the phosphor raw material solution having a precursor substance which forms a hydrogen halide in a gaseous state at a pyrolysis temperature incorporated in the aqueous metal salt solution.

In the production process according to the fifth embodiment, although depending upon the composition of the phosphor to be produced, in order to obtain a phosphor comprising as a main phase an oxide having a high crystallinity and high emission brightness, heating and pyrolysis of the solid phosphor raw material particles in the pyrolysis furnace is carried out preferably at a temperature within a range of from 600 to 1900° C. for a residue time within a range of from 0.5 second to 1 minute, particularly preferably at a temperature within a range of from 1450 to 1800° C. for a residue time within a range of from 0.5 second to 1 minute.

The process for producing a phosphor according to the sixth embodiment of the present invention is characterized in that when the fine droplets of the metal salt aqueous solution or the solid phosphor raw material particles obtained by drying them are heated with the carrier gas to carry out pyrolysis to synthesize the desired phosphor, a compound as a dispersant which has a role to disperse phosphor particles to be formed in the reaction system, is made to coexist in the reaction system as an additive, and the above droplets or the above solid phosphor raw material particles are heated and subjected to pyrolysis, and heating following the pyrolysis is continued in such a state that the above dispersant in a molten state is contacted with the firstly formed precursor of the phosphor (hereinafter various intermediates produced by pyrolysis of the solid phosphor raw material particles, present in the process in which the pyrolysis product becomes the crystal nuclei for the desired phosphor, will generically be referred to as "phosphor precursor"), whereby a plurality of phosphor particles formed from the above phosphor precursor, wrapped in the above dispersant which is solidified and formed into a particle, are taken out to the outside the reaction system together with the carrier gas. When the crystal nuclei of the phosphor are formed from the phosphor precursor, mutually direct contact of the above phosphor precursor is inhibited by the liquid dispersant present at the surrounding of the precursor, and aggregation of particles in the process of crystal growth of the phosphor crystal nuclei can be prevented, whereby phosphor particles, each particle being in substantially independent particle form, can be obtained and as a result, it becomes possible to produce fine phosphor particles having a high purity, a uniform chemical composition and excellent dispersibility.

In the production process according to the sixth embodiment, the dispersant introduced into the reaction system as an additive at the time of pyrolysis may be any substance which is molten at the time of pyrolysis to constitute the dispersion system of phosphor particles to be formed via the phosphor precursor, and it is preferred to use the substance which hardly reacts with the phosphor particles chemically. Further, it is also possible to add a precursor substance of the dispersant, which functions similarly to the above dispersant at the time of pyrolysis.

To introduce this dispersant or the precursor substance thereof to the reaction system at the time of pyrolysis, either of a method of preliminarily adding it to the aqueous metal salt solution and spraying the aqueous phosphor raw material solution containing both into the carrier gas to form fine droplets thereof, and a method of spraying a phosphor raw material solution comprising the metal salt solution alone into the carrier gas to form fine droplets, followed by drying to obtain solid phosphor raw material particles, and spraying a dispersant which is made to be in a molten state or a gaseous state by heating to a high temperature on the surface of the above solid phosphor raw material particles in the above carrier gas to form a dispersant particle which wraps the above solid phosphor raw material particles therein or which is attached to the particles, may be selected. In short, it is important that phosphor particles formed via the phosphor precursor, which is formed by pyrolysis of a droplet of the phosphor raw material solution or a solid phosphor raw material particle are dispersed in the dispersant molten at the time of pyrolysis. In each method, it is preferred to remove the above dispersant after the crystals of the phosphor are grown to obtain fine phosphor particles.

The phosphor raw material solution comprising the aqueous metal salt solution alone or comprising the aqueous metal salt solution and containing a dispersant or a precursor substance thereof, is formed into fine droplets in the carrier gas in accordance with the above-described steps in common with the processes for producing a phosphor of the present invention, and an operation of classification and drying is further applied to the fine droplets as the case requires, and the formed solid phosphor raw material particles containing a dispersant or a precursor thereof, or said solid phosphor raw material particles, on the surface of which a dispersant in a gaseous state is sprayed, are heated to carry out pyrolysis, whereby a phosphor according to the sixth embodiment of the present invention is produced.

In the production process according to the sixth embodiment of the present invention, as the above dispersant or a precursor substance thereof, to be added to the phosphor raw material solution or to be sprayed on the surface of the solid phosphor raw material particles obtained by drying droplets of the phosphor raw material solution, at least one compound selected from the group consisting of an alkali metal halide, an alkaline earth metal halide, a zinc halide and an alkali metal sulfide, may be used. Among them, it is preferred to use at least one compound selected from the group consisting of an alkali metal halide, a chloride of an alkaline earth metal except for beryllium, magnesium bromide, zinc fluoride, lithium sulfide, sodium sulfide and potassium sulfide.

The amount of the dispersant in a formed dispersant particle which wraps the phosphor particles at the time of pyrolysis, is preferably from 1 to 100 times the volume of the phosphor. If the amount of the dispersant is smaller than the above proportion, crystallinity of the phosphor can not adequately be improved, and aggregation of the synthesized phosphor particles may not be avoided. If the amount is larger than the above proportion, although crystallinity of the phosphor may adequately improve, the amount of the phosphor single crystals formed in a dispersant particle tends to be small, thus decreasing productivity. The more preferred amount of the dispersant is from 1 to 20 times the volume of the obtained phosphor.

In the production process according to the sixth embodiment of the present invention, as a heating condition in the pyrolysis step, although depending upon the type of the phosphor to be produced, it is necessary to carry out the pyrolysis of the droplets of the phosphor raw material solution or the solid phosphor raw material obtained by drying them at a temperature of at least the melting point of the dispersant at least at the time of heating the phosphor precursor formed by pyrolysis of said solid phosphor raw material particles, as it is required that the dispersant is in a molten state during the heating for pyrolysis, and it is preferred to carry out the pyrolysis at a temperature of at most a temperature higher than the melting point by 200° C. By carrying out the pyrolysis at a temperature of at least the melting point of the dispersant or a precursor thereof and at most a temperature higher than the melting point by 200° C., the phosphor precursor can be wrapped in a dispersant particle at the time of pyrolysis, and the crystal nuclei of the phosphor can be formed and grown from the phosphor precursor, the surrounding of which is wrapped with the dispersant in a molten state, whereby the phosphor particles after synthesis are hardly aggregated. As a result, the crystallinity of the phosphor can remarkably be improved, and fine phosphor particles having a high purity and uniform chemical composition can be obtained.

The dispersant which wraps the phosphor particles formed from the phosphor precursor is preferably removed after completion of the synthesis of the phosphor, in order to maintain emission properties, since the dispersant may absorb incident electron or ultraviolet rays used to excite the phosphor or absorbs emission from the phosphor, thus decreasing the emission properties in some cases.

When a water-soluble inorganic salt is used as the dispersant, the dispersant can easily be removed by dissolving it in water after synthesis of the phosphor in the dispersant, whereby recovery of the fine phosphor particles can easily be carried out. As the melting point of the usable dispersant is lower than the melting point of the phosphor, it is possible to heat and evaporate the dispersant, and recover the phosphor particles by separation.

The maximum size of the phosphor particles contained in the dispersant particles is preferably within a range of from 1 to 500 nm, more preferably within a range of from 1 to 100 nm, furthermore preferably within a range of from 1 to 10 nm. If the maximum size of the phosphor particles is smaller than 1 nm, it is hard to uniformly introduce the activator in the crystal. On the other hand, if the maximum size of the phosphor particles is too large, it tends to be difficult to synthesize a plurality of phosphor particles which are spatially independent in a particle of the dispersant. Further, when the maximum size is at most 10 nm, emission properties of the phosphor can remarkably be improved.

5) Annealing Step

A two-stage heating method may also be employed wherein the phosphor obtained by the process according to any of the above-described first to sixth embodiments is subjected to pyrolysis in the pyrolysis furnace to obtain phosphor particles containing a desired crystal phase, and annealing is further carried out. By this annealing, crystallinity of the phosphor particles is increased, and at the same time, the valency of the activator ions is controlled to uniformly activate the inside of the crystal, whereby a phosphor having favorable emission properties can be obtained.

In this two-stage heating method (annealing method), the metal salt particles or the metal complex particles (solid phosphor particles) are subjected to pyrolysis in the pyrolysis furnace at a temperature within a range of from 1350 to 1900° C. for a heating time of at least 0.5 second and at most 10 minutes, and in a case of the phosphor obtained by the production process according to the above second embodiment of the present invention, for example, the thin film layer on the surface of the phosphor particles is removed, and annealing is carried out in the same atmosphere gas as the carrier gas at the time of pyrolysis at a temperature within a range of from 1000 to 1700° C. for at least 1 second and at most 24 hours, whereby a phosphor having more favorable emission properties can be obtained. At this time, if the annealing temperature is too low, or the annealing time is too short, the crystallinity tends to be low, and further, the valency of the activator ions can not be controlled, whereby the inside of the crystals can not uniformly be activated, and thus the emission properties tend to be low. Further, in the case of the phosphor obtained by the production process according to the above second embodiment, if annealing is carried out without removing the thin film layer formed on the surface, aggregated particles are likely to form, and the coating properties of the phosphor tend to decrease. On the other hand, if the annealing temperature is too high, or the annealing time is too long, not only an unnecessary energy is wasted, but also a large number of aggregated particles are formed, whereby no dense fluorescent layer can be formed, and no desired emission properties can be obtained.

Further, in the case of production by the production process of the present invention except for the case of the above Embodiment 5, if the heating temperature at the time of the above pyrolysis does not reach 1350° C. or the pyrolysis time does not reach 0.5 second, crystallinity will not adequately be favorable, and even when annealing is carried out at the above temperature within a range of from 1000 to 1700° C. for a time of at least 1 second and at most 24 hours, although the crystallinity will be favorable, an extremely large number of aggregated particles tend to be formed, whereby no dense fluorescent layer tends to be formed, and no desired emission properties will be obtained.

For prevention of formation of aggregated particles at the time of annealing, the annealing temperature is preferably lower than the pyrolysis temperature by at least 100° C., more preferably lower by at least 200° C.

Among the processes for producing a phosphor of the present invention, the production processes according to the first to fifth embodiments are suitable particularly for production of a phosphor comprising as the main component a crystal phase represented by the compositional formula $(R1_{1-x}, R2_x)_2O_3$ (where R1 is at least one element selected from the group consisting of Y, Gd, La, Lu and Sc, R2 is at least one element selected from the group consisting of Ce, Pr, Nd, Eu, Tb, Dy and Tm, and x is a number which satisfies $0<x\leq0.2$), and the production processes according to the third to fifth embodiments are suitable particularly for production of a phosphor comprising as the main component a crystal phase represented by the compositional formula $M^1M^2Al_{10}O_{17}$ (where $M^1$ is at least one element selected from the group consisting of Ba, Sr, Ca and Eu, and $M^2$ is at least one element selected from the group consisting of Mg and Mn).

Further, by the production processes according to the first to fifth embodiments of the present invention, a phosphor in the form of particles having an approximately spherical shape, wherein most part of the weight average particle diameter $D_{50}$ is within a range of from 0.1 to 50 μm, and the ratio of the minimum diameter ($D_S$) to the maximum diameter ($D_L$) of the phosphor particles ($D_S/D_L$) is within a range of from 0.8 to 1.0, can be obtained. By the production process according to the sixth embodiment of the present invention, a phosphor of so-called nanocrystals, in the form of particles having an approximately spherical shape with little aggregation, and having an average particle diameter of from about 1 to about 500 nm, can effectively be produced.

The phosphor obtained by the above production process of the present invention as explained in detail above, consists of fine particles having an approximately spherical shape with little aggregation, and when it is applied to a fluorescent layer for e.g. a fluorescent lamp, a cathode ray tube or a PDP, a homogeneous and dense fluorescent layer having high brightness can easily be formed.

EXAMPLES

Now, the present invention will be explained with reference to Examples.

Example 1

| Yttrium nitrate | 0.282 mol |
| Europium nitrate | 0.018 mol |
| Lithium nitrate | 0.3 mol |

The above components were dissolved in water and a small amount of nitric acid was added thereto so that the total amount would be 1 l.

Using air as a carrier gas, this "aqueous metal salt solution" was put in an ultrasonic atomizer provided with a transducer of 1.7 MHz to form fine droplets. Then, the fine droplets were classified by using an inertial classifier so that the fine droplets had a weight average particle diameter of 5 μm and 90 wt % of the fine droplets were fine droplets having a particle diameter of at most 10 μm.

The classified fine droplets were subjected to pyrolysis in an electric furnace having a maximum temperature of 1600° C. for a residue time of 10 seconds, and the formed particles were collected by a bag filter.

The particles were put in water, stirred and subjected to centrifugal separation, and the supernatant liquid was removed. This operation was carried out three times, followed by drying in a dryer of 120° C. to obtain a phosphor of Example 1 by the production process according to the above Embodiment 1. The average crystal growth rate of the phosphor was 0.27 $\mu m^3$/sec. The emission brightness of this phosphor under irradiation with ultraviolet rays of 254 nm was measured, whereupon it was 102 when the emission brightness of the phosphor of Comparative Example 1 under the same condition was 78. The weight average particle diameter $D_{50}$ of the phosphor was measured by means of a laser diffraction method, whereupon it was 1.0 μm. According to a scanning electron micrograph of the obtained phosphor, the average value of the minimum diameter relative to the maximum diameter was 0.95, and the number of particles which satisfied the condition of (minimum diameter/maximum diameter) being from 0.8 to 1.0 was 95% of the entire particles.

Comparative Example 1

| Yttrium nitrate | 0.282 mol |
| Europium nitrate | 0.018 mol |

The above components were dissolved in water and a small amount of nitric acid was added thereto so that the total amount would be 1 l.

Using air as a carrier gas, this aqueous metal salt solution was put in an ultrasonic atomizer provided with a transducer of 1.7 MHz to form fine droplets. Then, the droplets were classified by using an inertial classifier so that the fine droplets had a weight average particle diameter of 5 μm and 90 wt % of the fine droplets were fine droplets having a particle diameter of at most 10 μm.

The classified fine droplets were subjected to pyrolysis in an electric furnace having a maximum temperature of 1600° C. for a residue time of 10 seconds, and the formed particles were collected by a bag filter.

The particles were subjected to the same treatment as in Example 1 to obtain a phosphor of Comparative Example 1. The average crystal growth rate of the phosphor was 0.0008

$\mu m^3$/sec. The emission brightness of this phosphor under irradiation with ultraviolet rays of 254 nm was measured, whereupon it was 78. The weight average particle diameter $D_{50}$ of the phosphor was measured by means of a laser diffraction method, whereupon it was 1.5 $\mu m$. According to a scanning electron micrograph of the obtained phosphor, the average value of the minimum diameter relative to the maximum diameter was 0.95, and the number of particles which satisfied the condition of (minimum diameter/maximum diameter) being from 0.8 to 1.0 was 100% of the entire particles.

Example 2

A phosphor of Example 2 by the production process according to the above Embodiment 1 was obtained in the same manner as in Example 1 except that the maximum temperature in the electric furnace was changed from 1600° C. to 1500° C. The average crystal growth rate of the phosphor was 0.003 $\mu m^3$/sec. The emission brightness of the phosphor under irradiation with ultraviolet rays of 254 nm was measured, whereupon it was 89 when the brightness of the phosphor of Comparative Example 1 under the same condition was 78. The weight average particle diameter $D_{50}$ of the phosphor was measured by means of a laser diffraction method, whereupon it was 1.1 $\mu m$. According to a scanning electron micrograph of the obtained phosphor, the average value of the minimum diameter relative to the maximum diameter was 0.95, and the number of particles which satisfied the condition (minimum diameter/maximum diameter) being from 0.8 to 1.0 was 95% of the entire particles.

Example 3

Each of yttrium nitrate and europium nitrate was dissolved in water so that the chemical composition of the phosphor would be $(Y_{0.94}, Eu_{0.06})_2O_3$, sodium nitrate was added in an amount of 2 mol per 1 mol of $(Y_{0.94}, Eu_{0.06})_2O_3$, and a small amount of nitric acid was added thereto to prepare a homogeneous aqueous metal salt solution having a solute concentration C as yttrium europium nitrate of 0.3. No solid content was present in the aqueous metal salt solution.

Using air as a carrier gas, the above aqueous metal salt solution was formed into fine droplets by using an ultrasonic atomizer provided with a transducer of 1.7 MHz. Then, the fine droplets were classified by using an inertial classifier so that the fine droplets had a weight average particle diameter of 5 $\mu m$ and 90 wt % of the fine droplets had a particle diameter of at most 10 $\mu m$.

The classified fine droplets were dried by heating at 200° C., by raising the temperature at a heating rate of 50° C. per second to obtain metal salt particles. The metal salt particles were transferred to a pyrolysis furnace while keeping them at 200° C., and subjected to pyrolysis by heating in the furnace having a maximum temperature of 1600° C. for 13 seconds to synthesize oxide phosphor particles by the production process according to the above Embodiment 2, and they were collected by a bag filter. In the atmosphere gas for the pyrolysis, potassium nitrate added to the above aqueous metal salt solution was reacted with water and contained as potassium hydroxide in a gaseous state.

The shape of the obtained phosphor particles was observed by a scanning electron microscope, whereupon a thin film layer of sodium hydroxide with a thickness of about 0.1 $\mu m$ was formed on the surface of the phosphor particles. This thin film layer was removed by using water and diluted nitric acid, and powder X-ray diffraction pattern was examined, whereupon formation of single phase phosphor particles without an impurity phase was found.

The shape of the phosphor particles was a spherical shape with a uniform particle diameter with a smooth surface, the average ratio of the minimum diameter to the maximum diameter was 0.95, and the number of particles which satisfied $0.8 \leq$ (minimum diameter/maximum diameter) $\leq 1.0$ was 95% of the entire particles. The median diameter $D_{50}$ was 1 $\mu m$, and substantially no aggregated particles were observed. The emission spectrum was measured by irradiating the phosphor with ultraviolet rays having a wavelength of 254 nm, whereupon favorable red light emission was shown, and the emission intensity was 100. Further, the phosphor was coated on a glass sheet by sedimentation, whereupon a dense and smooth fluorescent layer as compared with a conventional phosphor could be formed.

Example 4

Each of barium nitrate, europium nitrate, magnesium nitrate and aluminum nitrate was dissolved in water so that the chemical composition of the phosphor would be $(Ba_{0.9}, Eu_{0.1})MgAl_{10}O_{17}$, potassium nitrate was added thereto in an amount of 8 mol per 1 mol of $(Ba_{0.9}, Eu_{0.1})MgAl_{10}O_{17}$, and a small amount of nitric acid was added thereto to prepare a homogeneous aqueous metal salt solution having a solute concentration C of 0.3. Here, no solid content was present therein.

Using nitrogen containing 4 vol % of hydrogen as a carrier gas, the above aqueous metal salt solution was formed into fine droplets by means of an ultrasonic atomizer provided with a transducer of 1.7 MHz. Then, the fine droplets were classified by using an inertial classifier so that the fine droplets had a weight average particle diameter of 5 $\mu m$ and 90 wt % of the fine droplets were fine droplets having a particle diameter of at most 10 $\mu m$, and at the same time, the droplet volume per unit volume of the carrier gas was concentrated five times.

The classified fine droplets were dried by heating at 200° C. by raising the temperature at a heating rate of 50° C. per second to obtain metal salt particles. The metal salt particles were transferred to a pyrolysis furnace while keeping them at 200° C., and subjected to pyrolysis by heating in a furnace having a maximum temperature of 1600° C. for 10 seconds to synthesize oxide phosphor particles by the production process according to the above Embodiment 2, and the particles were collected by a bag filter. It was confirmed that in the atmosphere gas for pyrolysis, sodium nitrate added to the above aqueous metal salt solution was reacted with water and contained as sodium hydroxide in a gaseous state.

The shape of the obtained phosphor particles was observed by a scanning electron microscope, whereupon a thin film layer of potassium hydroxide with a thickness of about 0.1 $\mu m$ was formed on the surface of the phosphor particles. The thin film layer was removed by using water and diluted nitric acid, and then powder X-ray diffraction pattern was examined, whereupon formation of single phase phosphor particles without an impurity phase was found.

The phosphor particles were packed in a calcination container and subjected to annealing in nitrogen containing 4 vol % of hydrogen at 1400° C. for 2 hours, and emission properties were adjusted to obtain a phosphor. Powder X-ray diffraction pattern of the obtained phosphor was examined, whereupon formation of a single phase phosphor without an impurity phase was found. Further, the shape of the phosphor was a spherical shape with a uniform particle diameter with a smooth surface, the average value of the ratio of the minimum diameter to the maximum diameter was 0.98, and the number of particles which satisfied 0.8≦(minimum diameter/maximum diameter)≦1.0 was 95% of the entire particles. Further, the median particle diameter $D_{50}$ was 1 µm. The phosphor was irradiated with ultraviolet rays having a wavelength of 254 nm to measure an emission spectrum, whereupon favorable blue light emission was shown, and the emission intensity was 100. Further, the phosphor was coated on a glass sheet by sedimentation, whereupon a dense and smooth fluorescent layer as compared with a conventional phosphor could be formed.

Comparative Example 2

A phosphor of Comparative Example 3 was obtained in the same manner as in Example 4 except that addition of potassium nitrate was omitted.

Powder X-ray diffraction pattern of the obtained phosphor was examined, whereupon formation of a single phase phosphor without an impurity phase was found. Further, the shape of the phosphor was a spherical shape with a uniform particle diameter with a smooth surface, the medium diameter $D_{50}$ was 1.1 µm, and substantially no aggregated particles were observed. The phosphor was irradiated with ultraviolet rays having a wavelength of 254 nm to measure an emission spectrum, whereupon blue light emission was shown, however, the emission intensity was 60% of the emission intensity of the phosphor of Example 4 measured under the same conditions.

Example 5

Each of yttrium nitrate and europium nitrate was dissolved in water so that the chemical composition of the phosphor would be $(Y_{0.94}, Eu_{0.06})_2O_3$, lithium chloride was added thereto in an amount of 1.3 mol per 1 mol of $(Y_{0.94}, Eu_{0.06})_2O_3$, and a small amount of nitric acid was added thereto to prepare a homogeneous aqueous metal salt solution having a solute concentration C as yttrium europium nitrate of 0.3. The obtained aqueous solution had a pH of 0.8, and no solid content was present.

Using air as a carrier gas, the above aqueous metal salt solution was put in an ultrasonic atomizer provided with a transducer of 1.7 MHz to form fine droplets. Then, the fine droplets were classified by using an inertial classifier so that the fine droplets had a weight average particle diameter of 5 µm, and 90 wt % of the fine droplets were fine droplets having a particle diameter of at most 10 µm.

The classified fine droplets were dried by heating at 200° C. by raising the temperature at a heating rate of 50° C. per second to obtain metal salt particles. The metal salt particles were transferred to a pyrolysis furnace while keeping them at 200° C., lithium chloride was vaporized to form an atmosphere containing lithium chloride in a gaseous state, and the particles were subjected to pyrolysis in an electric furnace having a maximum temperature of 1600° C. for a residue time of 13 seconds to synthesize oxide phosphor particles by the production process according to the above Embodiment 3, and the particles were collected by a bag filter.

Powder X-ray diffraction pattern of the obtained phosphor was examined, whereupon formation of a single phase phosphor without an impurity phase was found. Further, the shape of the particles was a spherical shape with a uniform particle diameter with a smooth surface, the average particle diameter was 1 µm, and the number of phosphors having a value (minimum particle diameter/maximum particle diameter) within a range of from 0.8 to 1.0 was 95%. An emission spectrum of the phosphor was measured under irradiation with ultraviolet rays having a wavelength of 254 nm, whereupon favorable red light emission was shown, and the emission intensity was 102 when the emission intensity of the phosphor of Comparative Example 1 measured under the same conditions was 80.

Example 6

Each of barium nitrate, europium nitrate, magnesium nitrate and aluminum nitrate was dissolved in water so that the chemical composition of the phosphor would be $(Ba_{0.9}, Eu_{0.1})MgAl_{10}O_{17}$, sodium chloride was added thereto in an amount of 2.5 mol per 1 mol of $(Ba_{0.9}, Eu_{0.1})MgAl_{10}O_{17}$, and a small amount of nitric acid was added thereto to prepare a homogeneous aqueous metal salt solution having a solute concentration C of 0.3. The obtained aqueous solution had a pH of 0.8, and no solid content was present.

Using nitrogen containing 4 vol % of hydrogen as a carrier gas, the above aqueous metal salt solution was put in an ultrasonic atomizer provided with a transducer of 1.7 MHz to form fine droplets. Then, the fine droplets were classified by using an inertial classifier so that the fine droplets had a weight average particle diameter of 5 µm, and 90 wt % of the fine droplets were fine droplets having a particle diameter of at most 10 µm, and at the same time, the droplet volume per unit volume of the carrier gas for droplets was concentrated five times.

The classified fine droplets were dried by heating at 200° C. by raising the temperature at a heating rate of 50° C. per second to obtain metal salt particles. The metal salt particles were transferred to a pyrolysis furnace while keeping them at 200° C., sodium chloride was vaporized to form an atmosphere containing sodium chloride in a gaseous state, and the particles were subjected to pyrolysis in an electric furnace having a maximum temperature of 1600° C. for a residue time of 10 seconds to synthesize oxide particles by the production process according to the above Embodiment 3, and the particles were collected by a bag filter.

The oxide particles were packed in a calcination container and subjected to annealing in nitrogen containing 4 vol % of hydrogen at 1400° C. for 2 hours, and emission properties were adjusted to obtain a phosphor.

Powder X-ray diffraction pattern of the obtained phosphor was examined, whereupon formation of a single phase phosphor without an impurity phase was found. Further, the shape of the particles was a spherical shape with a uniform particle diameter with a smooth surface, the average particle diameter was 1 µm, and the number of phosphors having a value (minimum particle diameter/maximum particle diameter) within a range of from 0.8 to 1.0 was 98%. An emission spectrum of the phosphor was measured under irradiation with ultraviolet rays having a wavelength of 254 nm, whereupon favorable blue light emission was shown, and the emission intensity was 100 when the emission intensity of the phosphor of Comparative Example 2 measured under the same conditions was 60.

Example 7

Each of yttrium nitrate and europium nitrate was dissolved in water so that the chemical composition of the phosphor would be $(Y_{0.94}, Eu_{0.06})_2O_3$, lithium nitrate was added thereto in an amount of 1.5 mol per 1 mol of $(Y_{0.94}, Eu_{0.06})_2O_3$, and a small amount of nitric acid was added thereto to prepare a homogeneous aqueous metal salt solution having a solute concentration C as yttrium europium nitrate of 0.3. The obtained aqueous solution had a pH of 1.2, and no solid content was present.

Using air as a carrier gas, the above aqueous metal salt solution was put in an ultrasonic atomizer provided with a transducer of 1.7 MHz to form fine droplets. Then, the fine droplets were classified by using an inertial classifier so that the fine droplets had a weight average particle diameter of 5 μm, and 90 wt % of the fine droplets were fine droplets having a particle diameter of at most 10 μm.

The classified fine droplets were dried by heating at 200° C. by raising the temperature at a heating rate of 50° C. per second to obtain metal salt particles. The metal salt particles were transferred to a pyrolysis furnace while keeping them at 200° C., lithium nitrate was reacted with water to form an atmosphere containing lithium hydroxide in a gaseous state, and the particles were subjected to pyrolysis in an electric furnace having a maximum temperature of 1600° C. for a residue time of 13 seconds to synthesize oxide particles by the production process according to the above Embodiment 4, and the particles were collected by a bag filter.

Powder X-ray diffraction pattern of the obtained phosphor was examined, whereupon formation of a single phase phosphor without an impurity phase was found. Further, the shape of the particles was a spherical shape with a uniform particle diameter with a smooth surface, the average particle diameter was 1 μm, and the number of phosphors having a value (minimum particle diameter/maximum particle diameter) within a range of from 0.8 to 1.0 was 98%. An emission spectrum of the phosphor was measured under irradiation with ultraviolet rays having a wavelength of 254 nm, whereupon favorable red light emission was shown, and the emission intensity was 100 when the emission intensity of the phosphor of Comparative Example 1 measured under the same conditions was 80.

Example 8

Each of barium nitrate, europium nitrate, magnesium nitrate and aluminum nitrate was dissolved in water so that the chemical composition of the phosphor would be $(Ba_{0.9}, Eu_{0.1})MgAl_{10}O_{17}$, sodium nitrate was added thereto in an amount of 3 mol per 1 mol of $(Ba_{0.9}, Eu_{0.1})MgAl_{10}O_{17}$, and a small amount of nitric acid was added thereto to prepare a homogeneous aqueous metal salt solution having a solute concentration C of 0.3. The obtained aqueous solution had a pH of 0.3, and no solid content was present.

Using nitrogen containing 4 vol % of hydrogen as a carrier gas, the above aqueous metal salt solution was put in an ultrasonic atomizer provided with a transducer of 1.7 MHz to form fine droplets. Then, the fine droplets were classified by using an inertial classifier so that the fine droplets had a weight average particle diameter of 5 μm, and 90 wt % of the fine droplets were fine droplets having a particle diameter of at most 10 μm, and at the same time, the droplet volume per unit volume of the carrier gas for droplets was concentrated five times.

The classified fine droplets were dried by heating at 200° C. by raising the temperature at a heating rate of 50° C. per second to obtain metal salt particles. The metal salt particles were transferred to a pyrolysis furnace while keeping them at 200° C., sodium nitrate was reacted with water to form an atmosphere containing sodium hydroxide in a gaseous state, and the particles were subjected to pyrolysis in an electric furnace having a maximum temperature of 1600° C. for a residue time of 10 seconds to synthesize oxide particles by the production process according to the above Embodiment 4, and the particles were collected by a bag filter.

The oxide particles were packed in a calcination container and subjected to annealing in nitrogen containing 4 vol % of hydrogen at 1400° C. for 2 hours, and emission properties were adjusted to obtain a phosphor.

Powder X-ray diffraction pattern of the obtained phosphor was examined, whereupon formation of a single phase phosphor without an impurity phase was found. Further, the shape of the particles was a spherical shape with a uniform particle diameter with a smooth surface, the average particle diameter was 1 μm, and the number of phosphors having a value (minimum particle diameter/maximum particle diameter) within a range of from 0.8 to 1.0 was 100%. An emission spectrum of the phosphor was measured under irradiation with ultraviolet rays having a wavelength of 254 nm, whereupon favorable blue light emission was shown, and the emission intensity was 105 when the emission intensity of the phosphor of Comparative Example 2 measured under the same conditions was 60.

Example 9

Each of yttrium nitrate and europium nitrate was dissolved in water so that the chemical composition of the phosphor would be $(Y_{0.94}, Eu_{0.06})_2O_3$, ammonium bromide was added thereto in an amount of 3 mol per 1 mol of $(Y_{0.94}, Eu_{0.06})_2O_3$, and a small amount of nitric acid was added thereto to prepare a homogeneous aqueous metal salt solution having a solute concentration C as yttrium europium nitrate of 0.3. The obtained aqueous solution had a pH of 1.4, and no solid content was present.

Using air as a carrier gas, the aqueous metal salt solution was put in an ultrasonic atomizer provided with a transducer of 1.7 MHz to form fine droplets. Then, the fine droplets were classified by using an inertial classifier so that the fine droplets had a weight average particle diameter of 5 μm, and 90 wt % of the fine droplets were fine droplets having a particle diameter of at most 10 μm.

The classified fine droplets were dried by heating at 200° C. by raising the temperature at a heating rate of 50° C. per second to obtain metal salt particles. The metal salt particles were transferred to a pyrolysis furnace while keeping them at 200° C., ammonium bromide was vaporized to form an atmosphere containing ammonium bromide in a gaseous state, and the particles were subjected to pyrolysis in an electric furnace having a maximum temperature of 1600° C. for a residue time of 13 seconds to synthesize oxide particles by the production process according to the above Embodiment 5, and the particles were collected by a bag filter.

Powder X-ray diffraction pattern of the obtained phosphor was examined, whereupon formation of a single phase phosphor without an impurity phase was found. Further, the shape of the particles was a spherical shape with a uniform particle diameter with a smooth surface, and the average particle diameter was 1 μm. An emission spectrum of the phosphor was measured under irradiation with ultraviolet rays having a wavelength of 254 nm, whereupon favorable red light emission was shown.

Example 10

Each of barium carbonate, europium oxide, magnesium carbonate and metal aluminum was dissolved in hydrochloric acid so that the chemical composition of the phosphor would be $(Ba_{0.9}, Eu_{0.1})MgAl_{10}O_{17}$, and ammonium chloride was added thereto in an amount of 10 mol per 1 mol of $(Ba_{0.9}, Eu_{0.1})MgAl_{10}O_{17}$ to prepare a homogeneous aqueous metal salt solution having a solute concentration C of 0.36. The obtained aqueous solution had a pH of 0.8, and no solid content was present.

Using nitrogen containing 4 vol % of hydrogen as a carrier gas, the aqueous metal salt solution was put in an ultrasonic atomizer provided with a transducer of 1.7 MHz to form fine droplets. Then, the fine droplets were classified by using an inertial classifier so that the fine droplets had a weight average particle diameter of 5 $\mu$m, and 90 wt % of the fine droplets were fine droplets having a particle diameter of at most 10 $\mu$m, and at the same time, the droplet volume per unit volume of the carrier gas for droplets was concentrated five times.

The classified fine droplets were dried by heating at 200° C. by raising the temperature at a heating rate of 50° C. per second to obtain metal salt particles. The metal salt particles were transferred to a pyrolysis furnace while keeping them at 200° C., ammonium chloride was vaporized to form an atmosphere containing hydrogen chloride in a gaseous state, and the particles were subjected to pyrolysis in an electric furnace having a maximum temperature of 1600° C. for a residue time of 10 seconds to synthesize oxide particles by the production process according to the above Embodiment 5, and the particles were collected by a bag filter. Powder X-ray diffraction pattern of the obtained phosphor was examined, whereupon formation of a single phase phosphor without an impurity phase was found. Further, the shape of the particles was a spherical shape with a uniform particle diameter with a smooth surface, and the average particle diameter was 1 $\mu$m. An emission spectrum of the phosphor was measured under irradiation with ultraviolet rays having a wavelength of 254 nm, whereupon favorable blue light emission was shown.

Example 11

Each of yttrium nitrate and europium nitrate was dissolved in water so that the chemical composition of the phosphor would be $(Y_{0.94}, Eu_{0.06})_2O_2S$, sodium nitrate as a precursor substance of a dispersant was added thereto so that the volume of sodium sulfide as the dispersant would be 10 times the volume of the $(Y_{0.94}, Eu_{0.06})_2O_2S$ phosphor, and nitric acid was added thereto to prepare a homogeneous aqueous solution having a solute concentration C as yttrium europium nitrate of 0.03 mol/l.

Using nitrogen containing 20 vol % of hydrogen sulfide as a carrier gas, the aqueous solution was put in an ultrasonic atomizer provided with a transducer of 1.7 MHz to form fine droplets.

The fine droplets were dried by heating to obtain solid phosphor raw material particles. The solid phosphor raw material particles were transferred to a pyrolysis furnace while keeping them at 200° C. and made to stay in an electric furnace having a maximum temperature of 650° C. for 3 seconds to carry out pyrolysis, and dispersant particles comprising sodium sulfide and phosphor particles, formed in the pyrolysis furnace and suspended in the carrier gas, were collected by an electric dust collector. The fracture surface of the obtained dispersant particles was observed, whereupon a large number of dispersed particles of the $(Y_{0.94}, Eu_{0.06})_2O_2S$ phosphor crystals were observed in the inside of the particles.

Further, the above obtained dispersant particles comprising sodium sulfide was washed with diluted hydrochloric acid and water, and sodium sulfide was removed to obtain $(Y_{0.94}, Eu_{0.06})_2O_2S$ phosphor particles by the production process according to the above Embodiment 6.

Powder X-ray diffraction pattern of this phosphor was examined, whereupon formation of a single phase oxysulfide phosphor without an impurity phase was found. Further, the shape and crystallinity of the phosphor particles were observed with an electron microscope, whereupon a large number of single crystals having an average particle diameter of 10 nm and having favorable crystallinity were observed. An emission spectrum of the phosphor under irradiation with electron rays of 25 kV was measured, whereupon favorable red light emission was shown.

Example 12

Each of yttrium nitrate and europium nitrate was dissolved in water so that the chemical composition of the phosphor would be $(Y_{0.94}, Eu_{0.06})_2O_3$, sodium chloride as a dispersant was added thereto so that its volume would be 4 times the volume of the $(Y_{0.94}, Eu_{0.06})_2O_3$ phosphor, and a small amount of nitric acid was added thereto to prepare a homogeneous aqueous solution having a solute concentration C as yttrium europium nitrate of 0.1 mol/l. The obtained aqueous solution had a pH of 1.0, and no solid content was present.

Using air as a carrier gas, the aqueous solution was put in an ultrasonic atomizer provided with a transducer of 1.7 MHz to form fine droplets having an average particle diameter of 5 $\mu$m.

The fine droplets were dried by heating to obtain solid phosphor raw material particles. The solid phosphor raw material particles were transferred to a pyrolysis furnace while keeping them at 200° C. and made to stay in an electric furnace having a maximum temperature of 850° C. for 1 second to carry out pyrolysis, and dispersant particles comprising sodium chloride and phosphor particles, formed in the pyrolysis furnace and suspended in the carrier gas, were collected by an electric dust collector. The fracture surface of the obtained dispersant particles was observed, whereupon a large number of dispersed particles of the $(Y_{0.94}, Eu_{0.06})_2O_3$ phosphor crystals were observed in the inside of the dispersant particles.

Further, the above obtained dispersant particles comprising sodium chloride was washed with diluted hydrochloric acid and water, and sodium chloride was removed to obtain $(Y_{0.94}, Eu_{0.06})_2O_3$ phosphor particles by the production process according to the above Embodiment 6.

Powder X-ray diffraction pattern of this phosphor was examined, whereupon formation of a single phase oxide phosphor without an impurity phase was found. Further, the shape and crystallinity of the phosphor particles were observed with an electron microscope, whereupon a large number of single crystals having an average particle diameter of 40 nm and having favorable crystallinity were observed. An emission spectrum of the phosphor under irradiation with ultraviolet rays having a wavelength of 254 nm was measured, whereupon favorable red light emission was shown.

Example 13

Each of zinc nitrate, silver chloride and thiourea was dissolved in water so that the chemical composition of the phosphor would be $Zn_{0.9998}Ag_{0.0002}Cl_{0.0002}S_{0.9998}$, and potassium bromide as a dispersant was added in a volume of five times the volume of the $Zn_{0.9998}Ag_{0.0002}Cl_{0.0002}S_{0.9998}$ phosphor to prepare a homogeneous aqueous solution having a solute concentration C of zinc nitrate and silver chloride of 0.05 mol/l.

Using nitrogen containing 5 vol % of hydrogen sulfide as a carrier gas, the aqueous solution was put in an ultrasonic atomizer provided with a transducer of 1.7 MHz to form fine droplets.

The fine droplets were dried by heating to obtain solid phosphor raw material particles. The solid phosphor raw material particles were transferred to a pyrolysis furnace while keeping them at 150° C. and made to stay in the pyrolysis furnace having a maximum temperature of 600° C. for 1.2 seconds to carry out pyrolysis to synthesize a $Zn_{0.9998}Ag_{0.0002}Cl_{0.0002}S_{0.9998}$ phosphor, and solid dispersant particles comprising phosphor particle and a mixture of potassium sulfide and potassium bromide, formed in the pyrolysis furnace and suspended in the carrier gas, were collected by an electric dust collector. The fracture surface of the obtained dispersant particles was observed, whereupon a large number of dispersed particles of the phosphor crystals were observed in the inside of the dispersant particles.

Further, the above obtained dispersant particles comprising phosphor particles and a mixture of potassium sulfide and potassium bromide were washed with diluted hydrochloric acid and water, and potassium sulfide and potassium bromide as the dispersant were removed to obtain $Zn_{0.9998}Ag_{0.0002}Cl_{0.0002}S_{0.9998}$ phosphor particles by the production process according to the above Embodiment 6.

Powder X-ray diffraction pattern of the phosphor was examined, whereupon formation of a single phase sulfide phosphor without an impurity phase was found. Further, the shape and crystallinity of the phosphor particles were observed with an electron microscope, whereupon a large number of single crystals having an average particle diameter of 9 nm and favorable crystallinity were observed. An emission spectrum of the phosphor under irradiation with electron rays of 25 kV was measured, whereupon favorable blue light emission was shown.

Comparative Example 3

Phosphor particles were obtained in the same manner as in Example 11 except that the maximum temperature of the pyrolysis furnace was changed from 650° C. to 200° C., and sodium sulfide as the dispersant was used in a solid state.

Powder X-ray diffraction pattern of the obtained phosphor was examined, whereupon an almost amorphous substance was formed, and no desired crystallinity was obtained. The phosphor was excited in the same manner as in Example 11, however, no emission was confirmed.

Comparative Example 4

Phosphor particles were obtained in the same manner as in Example 12 except that the maximum temperature of the pyrolysis furnace was changed from 850° C. to 600° C., and sodium chloride as the dispersant was used as a solid state.

Powder X-ray diffraction pattern of the obtained phosphor was examined, whereupon formation of a single phase oxide phosphor without an impurity phase was found. However, the shape and crystallinity of the phosphor particles were observed with an electron microscope, whereupon particles comprising irregular crystals aggregated, having poor crystallinity, were observed, and the particle diameter distribution was broad. An emission spectrum of this phosphor under irradiation with ultraviolet rays having a wavelength of 254 nm was measured, whereupon weak red light emission was shown.

Comparative Example 5

Phosphor particles were obtained in the same manner as in Example 12 except that addition of sodium chloride as the dispersant was omitted.

Powder X-ray diffraction pattern of the obtained phosphor was examined, whereupon formation of a single phase oxide phosphor without an impurity phase was found. However, the shape and crystallinity of the phosphor particles were observed with an electron microscope, whereupon particles comprising irregular crystals aggregated, having an average particle diameter of so large as 1 $\mu$m, and having poor crystallinity, were observed. An emission spectrum of this phosphor under irradiation with ultraviolet rays having a wavelength of 254 nm was measured, whereupon weak red light emission was shown.

Example 14

Phosphor particles were obtained in the same manner as in Example 12 except that the maximum temperature of the pyrolysis furnace was changed from 850° C. to 1600° C., and the dispersant was used in a gaseous state.

Powder X-ray diffraction pattern of the phosphor was examined, whereupon formation of a single phase oxide phosphor without an impurity phase was found. However, when the shape and crystallinity of the phosphor particles were observed with an electron microscope, only one particle of a polycrystal having an average particle diameter of so large as 1 $\mu$m and having favorable crystallinity was observed. An emission spectrum of this phosphor under irradiation with ultraviolet rays having a wavelength of 254 nm was measured, whereupon red light emission was shown.

INDUSTRIAL APPLICABILITY

According to the present invention, by employing the above constitution, a phosphor having a narrow particle diameter distribution, having a small number of aggregated particles, having a spherical shape, and having a high brightness, can easily be obtained. Further, when the phosphor is applied to a fluorescent layer for e.g. a cathode ray tube, a fluorescent lamp or PDP, it becomes possible to form a homogeneous and dense high brightness fluorescent layer. Further, since the phosphor has a high purity and a uniform chemical composition, it becomes possible to produce a phosphor having a high emission intensity at a low cost.

Further, according to the present invention, by employing the above constitution, phosphor particles having favorable crystallinity, having a small number of aggregated particles, having a high purity and uniform chemical composition, and being fine particles and excellent in emission properties, can be obtained.

The entire disclosures of Japanese Patent Application No. 2001-131207 filed on Apr. 27, 2001, Japanese Patent Application No. 2001-131208 filed on Apr. 27, 2001, Japanese Patent Application No. 2001-131209 filed on Apr. 27, 2001, Japanese Patent Application No. 2001-131210 filed on Apr. 27, 2001, Japanese Patent Application No. 2001-218181 filed on Jul. 18, 2001 and Japanese Patent Application No. 2001-256999 filed on Jul. 24, 2001 including specifications, claims and summaries are incorporated herein by reference in their entireties.

What is claimed is:

1. A process for producing a phosphor, which comprises forming droplets of a solution containing metal elements constituting the phosphor and pyrolyzing the droplets in the presence of an additive that promotes phosphor crystal growth and comprises a metal or a metal compound, wherein the pyrolysis conditions and the amount of the additive are such that the average crystal growth rate is at least 0.002 $\mu m^3$/sec.

2. The process for producing a phosphor according to claim 1, wherein pyrolysis is at a temperature is ranging from 1350 to 1900° C. and for a time ranging from 0.5 second and to 10 minutes.

3. The process for producing a phosphor according to claim 1, wherein the metal or metal compound is a nitrate, chloride or hydroxide containing at least one element selected from the group consisting of Li, Na, K, Rb and Cs.

4. A process for producing a phosphor, which comprises forming fine droplets by spraying into a gas a solution containing metal elements constituting the phosphor and an additive that promotes phosphor crystal growth and comprises a metal or a metal compound is sprayed to a gas to form the above fine droplets, which are dried to obtain, drying the fine droplets to produce metal salt particles or metal complex particles, and pyrolyzing the metal salt particles or metal complex particles, wherein during pyrolysis the additive is decomposed or evaporated to produce a liquid state or a gaseous state and wherein the pyrolysis conditions and the amount of the additive are such that the average crystal growth rate is at least 0.002 $\mu m^3$/sec.

5. The process for producing a phosphor according to claim 4, wherein pyrolysis is at a temperature ranging from 1350 to 1900° C. and for a time ranging from 0.5 second to 10 minutes.

6. The process for producing a phosphor according to claim 4, wherein the metal or metal compound is a nitrate, chloride or hydroxide containing at least one element selected from the group consisting of Li, Na, K, Rb and Cs.

7. A process for producing a phosphor, which comprises forming droplets of a solution containing metal elements constituting the phosphor and pyrolyzing the droplets in the presence of a substance for thin film layer formation, wherein the substance for thin film layer formation is precipitated on the surface of phosphor particles during pyrolysis to form a thin film layer having an average film thickness of at least 10 nm and wherein the thin film layer on the surface of the phosphor particles is removed after pyrolysis.

8. The process for producing a phosphor according to claim 7, wherein pyrolysis is at a temperature ranging from 1350 to 1900° C. and for a time ranging from 0.5 second to 10 minutes.

9. The process for producing a phosphor according to Claim 7, wherein the substance is a nitrate, chloride or hydroxide containing at least one element selected from the group consisting of Li, Na, K, Rb and Cs.

10. The process for producing a phosphor according to claim 7, wherein the phosphor contains at least one element selected from the group consisting of Y, Gd, La, Lu and Sc, and at least one element selected from the group consisting of Ce, Pr, Nd, Eu, Tb, Dy and Tm.

11. The process for producing a phosphor according to claim wherein the solution is preliminarily prepared to satisfy the relation $(A \times 0.1) \leq B$, where A is the total number of mols of the metal elements constituting the phosphor and B is the total number of mols of the metal elements contained in the substance for thin film layer formation.

12. The process for producing a phosphor according to claim 7, wherein the phosphor particles having the above thin film layer removed are subjected to annealing.

13. The process for producing a phosphor according to claim 12, wherein the annealing is at a temperature of ranging from 1000 to 1700° C. and at a temperature that is at least 100° C. less than the pyrolysis temperature, and wherein the annealing is for a time ranging from 1 second to 24 hours.

14. A process for producing a phosphor, which comprises forming fine droplets by spraying into a gas a solution containing metal elements constituting the phosphor and a substance for thin film layer formation, drying the fine droplets to produce metal salt particles or metal complex particles, and pyrolyzing the metal salt particles or metal complex particles, wherein during pyrolysis the substance for thin film layer formation is decomposed or evaporated to produce a liquid state or a gaseous state, wherein the substance for thin film layer formation is precipitated on the surface of phosphor particles during pyrolysis to form a thin film layer having an average film thickness of at least 10 nm.

15. The process for producing a phosphor according to claim 14, wherein the substance is a nitrate, chloride or hydroxide containing at least one element selected from the group consisting of Li, Na, K, Rb and Cs.

16. The process for producing a phosphor according to claim 14, wherein the phosphor contains at least one element selected from the group consisting of Y, Gd, La, Lu and Sc, and at least one element selected from the group consisting of Ce, Pr, Nd, Eu, Tb, Dy and Tm.

17. The process for producing a phosphor according to claim 14, wherein the solution is preliminarily prepared to satisfy the relation $(A \times 0.1) \leq B$, where A is the total number of mols of the metal elements constituting the phosphor and B is the total number of mols of the metal elements contained in the substance for thin film layer formation.

18. The process for producing a phosphor according to claim 14, wherein the thin film layer on the surface of the phosphor particles is removed after pyrolysis.

19. The process for producing a phosphor according to claim 18, wherein the phosphor particles having the above thin film layer removed are subjected to annealing.

20. The process for producing a phosphor according to claim 19, wherein the annealing is at a temperature ranging from 1000 to 1700° C. and a temperature that is at least 100° C. less than the pyrolysis temperature, and wherein the annealing is for a time ranging from 1 second to 24 hours.

21. A process for producing a phosphor, which comprises forming droplets of a solution containing metal elements constituting the phosphor and pyrolyzing the droplets in an atmosphere gas containing a gaseous substance comprising (a) a metal chloride in a gaseous state or (b) a metal hydroxide in a gaseous state.

22. The process for producing a phosphor according to claim 21, wherein the gaseous substance in the atmosphere gas in an amount ranging from 0.001 to 5 vol % based on the atmosphere gas.

23. The process for producing a phosphor according to claim 21, wherein the gaseous substance in a gaseous state is an alkali metal chloride or an alkali metal hydroxide.

24. The process for producing a phosphor according to claim 21, wherein the solution containing metal elements constituting the phosphor has a pH of at most 7.

25. The process for producing a phosphor according to claim 21, wherein the solid content of the solution containing metal elements constituting the phosphor is at most 10 wt %.

26. The process for producing a phosphor according to claim 21, wherein the total content of carbon monoxide and carbon dioxide in the atmosphere gas for pyrolysis is at most 5 vol %.

27. The process for producing a phosphor according to claim 21, wherein pyrolysis is at a temperature ranging from 1350° C. to 1900° C. for a time ranging from 0.5 second to 10 minutes.

28. The process for producing a phosphor according to claim 21, wherein the solution containing metal elements constituting the phosphor and the precursor which forms the substance in a gaseous state are admixed in a starting material solution prior to said forming fine droplets.

29. A process for producing a phosphor which comprises forming fine droplets by spraying into a gas a solution containing metal elements constituting the phosphor drying the fine droplets to produce metal salt particles or metal complex particles, and pyrolyzing the metal salt particles or metal complex particles in an atmosphere gas containing a gaseous substance comprising (a) a metal chloride in a gaseous state or (b) a metal hydroxide in a gaseous state.

30. The process for producing a phosphor according to claim 29, wherein the gaseous substance in the atmosphere gas is in an amount ranging from 0.001 to 5 vol % based on the atmosphere gas.

31. The process for producing a phosphor according to claim 29, wherein the gaseous substance in a gaseous state is an alkali metal chloride or an alkali metal hydroxide.

32. The process for producing a phosphor according to claim 29, wherein the solution containing metal elements constituting the phosphor has a pH of at most 7.

33. The process for producing a phosphor according to claim 29, wherein the solid content of the solution containing metal elements constituting the phosphor is at most 10 wt %.

34. The process for producing a phosphor according to claim 29, wherein the total content of carbon monoxide and carbon dioxide in the atmosphere gas for pyrolysis is at most 5 vol %.

35. The process for producing a phosphor according to claim 29, wherein pyrolysis is at a temperature ranging from 1350° C. to 1900° C. for a time ranging from 0.5 second to 10 minutes.

36. The process for producing a phosphor according to claim 29, wherein the solution containing metal elements constituting the phosphor and the precursor which forms the substance in a gaseous state are admixed in a starting material solution prior to said forming fine droplets.

37. A process for producing phosphor particles, which comprises forming droplets of a solution containing metal elements constituting the phosphor and pyrolyzing the droplets while contacting the droplets with a dispersant in which said phosphor particles are dispersed so that a plurality of phosphor particles are dispersed in a particle of the dispersant.

38. The process for producing phosphor particles according to claim 37, wherein the dispersant is a material derived from a precursor substance of the dispersant which may form a dispersant in a molten state at the time of formation of the phosphor particles.

39. The process for producing phosphor particles according to claim 37, wherein the solution containing metal elements constituting the phosphor and the dispersant or the precursor substance thereof are admixed in a starting material solution prior to said forming fine droplets.

40. The process for producing phosphor particles according to claim 37, wherein the dispersant or a precursor substance thereof is one or more compounds selected from the group consisting of an alkali metal halide, an alkaline earth metal halide, zinc halide and an alkali metal sulfide.

41. The process for producing phosphor particles according to claim 37, wherein after the phosphor particles are formed, the dispersant is dissolved in water and removed.

42. The process for producing phosphor particles according to claim 37, wherein the maximum size of the phosphor particles is ranges from 1 to 500 nm.

43. A process for producing a phosphor which comprises forming fine droplets by spraying into a carrier gas a solution containing metal elements constituting the phosphor, drying said fine droplets produce a solid phosphor raw material, heating said solid phosphor raw material to form a precursor of the phosphor, and pyrolyzing the said solid phosphor raw material while contacting said precursor of the phosphor and the dispersant in a molten state, to form a plurality of phosphor particles comprising a crystal phase of the above phosphor particles as the main phase, in a particle of the dispersant suspended in the carrier gas.

44. The process for producing phosphor particles according to claim 43, wherein the dispersant is a material derived from a precursor substance of the dispersant which may form a dispersant in a molten state at the time of formation of the phosphor particles.

45. The process for producing phosphor particles according to claim 43, wherein the solution containing metal elements constituting the phosphor, and the dispersant or the precursor substance thereof are admixed in a starting material solution prior to said forming fine droplets.

46. The process for producing phosphor particles according to claim 43, wherein the dispersant or a precursor substance thereof is one or more compounds selected from the group consisting of an alkali metal halide, an alkaline earth metal halide, zinc halide and an alkali metal sulfide.

47. The process for producing phosphor particles according to claim 43, wherein after the phosphor particles are formed, the dispersant is dissolved in water and removed.

48. The process for producing phosphor particles according to claim 43, wherein the maximum size of the phosphor particles ranges from 1 to 500 nm.

49. A process for producing a phosphor, which comprises forming droplets of a solution containing metal elements constituting the phosphor and pyrolyzing the droplets in the presence of a substance for thin film layer formation, wherein the substance for thin film layer formation is precipitated on the surface of phosphor particles during pyrolysis to form a thin film layer having an average film thickness of at least 10 nm, and wherein for the pyrolysis, the heating temperature is adjusted to from 1350 to 1900° C., and the heating time is adjusted to at least 0.5 second and at most 10 minutes.

50. The process for producing a phosphor according to claim 49, wherein the substance is a nitrate, chloride or hydroxide containing at least one element selected from the group consisting of Li, Na, K, Rb and Cs.

51. The process for producing a phosphor according to claim 49, wherein the phosphor contains at least one element selected from the group consisting of Y, Gd, La, Lu and Sc, and at least one element selected from the group consisting of Ce, Pr, Nd, Eu, Tb, Dy and Tm.

52. The process for producing a phosphor according to claim 49, wherein the solution is preliminarily prepared to satisfy the relation $(A \times 0.1) \leq B$, where A is the total number of mols of the metal elements constituting the phosphor and B is the total number of mols of the metal elements contained in the substance for thin film layer formation.

53. The process for producing a phosphor according to claim 49, wherein the phosphor particles having the above thin film layer removed are subjected to annealing.

54. The process for producing a phosphor according to claim 53, wherein the annealing is at a temperature ranging from 1000 to 1700° C. and a temperature that is at least 100° C. less than the pyrolysis temperature, and wherein the annealing is for a time ranging from 1 second to 24 hours.

55. A process for producing a phosphor, which comprises forming droplets of a solution containing metal elements constituting the phosphor and pyrolyzing the droplets in an atmosphere gas containing a gaseous substance comprising a hydrogen halide in a gaseous state wherein the gaseous substance in the atmosphere gas for the pyrolysis is present in an amount of from 0.001 to 5 vol % based on the atmosphere gas.

56. The process for producing a phosphor according to claim 55 wherein pyrolysis is at a temperature ranging from 1350° C. to 1900° C. for a time ranging from 0.5 second to 10 minutes.

57. The process for producing a phosphor according to claim 55, wherein the solution containing metal elements constituting the phosphor and the precursor which forms the substance in a gaseous state are admixed in a starting material solution prior to said forming fine droplets.

* * * * *